US012511983B2

(12) United States Patent
Favier

(10) Patent No.: US 12,511,983 B2
(45) Date of Patent: Dec. 30, 2025

(54) ELECTRONIC ARTICLE SURVEILLANCE AND SECURITY DEVICES

(71) Applicant: All-Tag Corporation, Boca Raton, FL (US)

(72) Inventor: Alain Favier, Paris (FR)

(73) Assignee: All-Tag Corporation, Boca Raton, FL (US)

( * ) Notice: Subject to any disclaimer, the term of this patent is extended or adjusted under 35 U.S.C. 154(b) by 472 days.

(21) Appl. No.: 17/871,071

(22) Filed: Jul. 22, 2022

(65) Prior Publication Data

US 2023/0162581 A1 May 25, 2023

Related U.S. Application Data

(63) Continuation-in-part of application No. PCT/US2021/014577, filed on Jan. 22, 2021.

(60) Provisional application No. 63/317,184, filed on Mar. 7, 2022, provisional application No. 63/238,568, filed on Aug. 30, 2021, provisional application No. 62/964,736, filed on Jan. 23, 2020.

(51) Int. Cl.

| | |
|---|---|
| ***G08B 13/24*** | (2006.01) |
| ***B32B 7/06*** | (2019.01) |
| ***B32B 7/12*** | (2006.01) |

(52) U.S. Cl.

CPC ............ *G08B 13/2434* (2013.01); *B32B 7/06* (2013.01); *B32B 7/12* (2013.01)

(58) Field of Classification Search

CPC .......... G08B 13/2434; B32B 7/06; B32B 7/12
See application file for complete search history.

(56) References Cited

U.S. PATENT DOCUMENTS

| | | | | |
|---|---|---|---|---|
| 5,129,516 A * | 7/1992 | Theros | B65D 75/225 | 206/463 |
| 5,586,657 A * | 12/1996 | Ward | B65D 75/54 | 206/459.1 |
| 5,871,100 A * | 2/1999 | Ward | H01M 50/213 | 340/572.1 |
| 6,011,472 A * | 1/2000 | Pendergraph | B65D 73/0092 | 340/568.1 |
| 6,023,864 A * | 2/2000 | Liebenow | G09F 3/16 | 24/482 |

(Continued)

FOREIGN PATENT DOCUMENTS

WO 2021150868 A1 7/2021

*Primary Examiner* — Curtis J King

(74) *Attorney, Agent, or Firm* — Breiner & Breiner, L.L.C.

(57) ABSTRACT

There is disclosed an improved disposable keeper that has no locking or unlocking mechanism and which is of a reduced size. The keeper may comprise a rigid or flexible casing that substantially corresponds to the shape of a product and adapted to cover at least one portion of one side of the product but not fully enclosing the product; a security element or a non-EAS printed label attached to the casing and adapted to be inaccessible to a consumer when the keeper is attached to the product; and a flexible adhesive support attached to the casing and adapted to wrap around the product or a double sided adhesive support to attach the Keeper to a product. Additionally, keepers are disclosed which attach by a two-sided adhesive to a product and which if removed will damage the product packaging and detrimentally effect the resale of the product.

24 Claims, 26 Drawing Sheets

(56) References Cited

U.S. PATENT DOCUMENTS

| | | | | |
|---|---|---|---|---|
| 6,254,953 | B1 * | 7/2001 | Elston | G08B 13/2434 428/137 |
| 6,278,371 | B1 | 8/2001 | Hopkins | |
| 6,676,175 | B2 | 1/2004 | Jaeb et al. | |
| 6,724,311 | B1 * | 4/2004 | Kolton | G08B 13/2437 340/568.1 |
| 6,986,424 | B1 * | 1/2006 | Morrison | B65D 75/368 206/703 |
| 7,095,327 | B2 | 8/2006 | Kolton et al. | |
| 7,383,954 | B2 * | 6/2008 | Morrison | B65D 67/02 206/576 |
| 7,999,672 | B1 * | 8/2011 | Feibelman | G08B 13/2445 340/568.1 |
| 8,757,377 | B2 | 6/2014 | Alexander et al. | |
| 9,228,378 | B1 * | 1/2016 | Sarabi | E05B 73/0005 |
| 9,251,679 | B2 * | 2/2016 | Wandel | E05B 73/0017 |
| 10,121,342 | B2 * | 11/2018 | Alvarez | E05B 73/0017 |
| D900,637 | S * | 11/2020 | Baker | D9/722 |
| 11,455,508 | B2 * | 9/2022 | Sandoval | G08B 13/2434 |
| 11,462,088 | B2 * | 10/2022 | Sandoval | G08B 13/149 |
| 2008/0061140 | A1 | 3/2008 | McMahon | |
| 2008/0143537 | A1 | 6/2008 | Nichols | |
| 2010/0277323 | A1 * | 11/2010 | Feibelman | E05B 73/0035 340/572.9 |
| 2010/0314277 | A1 * | 12/2010 | Murray | B65D 73/0014 224/269 |
| 2012/0031809 | A1 * | 2/2012 | Methe | B65D 75/522 206/703 |
| 2012/0193422 | A1 * | 8/2012 | Franz | G06K 7/0004 235/462.13 |
| 2013/0015215 | A1 * | 1/2013 | Coote | A47F 5/00 29/428 |
| 2013/0174617 | A1 * | 7/2013 | Piccoli | E05B 73/0017 70/58 |
| 2014/0104061 | A1 * | 4/2014 | Luo | G08B 13/1445 340/572.8 |
| 2014/0158574 | A1 * | 6/2014 | Forbes | G08B 13/126 220/729 |
| 2015/0048946 | A1 * | 2/2015 | Luo | E05B 73/0017 340/572.8 |
| 2015/0262463 | A1 * | 9/2015 | Piccoli | G08B 13/1463 340/572.8 |
| 2015/0287299 | A1 * | 10/2015 | Eckert | G08B 13/1409 340/568.2 |
| 2017/0036838 | A1 * | 2/2017 | Kaiserman | G06Q 10/08 |
| 2017/0200357 | A1 * | 7/2017 | Sayegh | G08B 13/2434 |
| 2017/0204638 | A1 * | 7/2017 | Trincale | G07C 9/00944 |
| 2017/0253408 | A1 * | 9/2017 | Strassburger | B65D 79/02 |
| 2018/0082555 | A1 * | 3/2018 | Zhang | G08B 13/2434 |
| 2018/0155103 | A1 * | 6/2018 | Ou | B25H 3/003 |
| 2018/0158301 | A1 * | 6/2018 | Alvarez | E05B 73/0035 |
| 2018/0276964 | A1 * | 9/2018 | Yang | G08B 13/2448 |
| 2018/0340357 | A1 * | 11/2018 | Carreon | E05B 73/0029 |
| 2018/0374326 | A1 * | 12/2018 | Martino | G08B 13/2448 |
| 2019/0014926 | A1 * | 1/2019 | Chern | A47F 5/0006 |
| 2019/0244501 | A1 * | 8/2019 | Favier | G09F 3/10 |
| 2021/0054664 | A1 * | 2/2021 | Napthine | E05B 73/0017 |
| 2022/0180144 | A1 * | 6/2022 | Sandoval | G08B 13/2448 |
| 2022/0238044 | A1 * | 7/2022 | Petryczka | G08B 13/2434 |
| 2022/0406156 | A1 * | 12/2022 | Napthine | E05B 73/0017 |

* cited by examiner

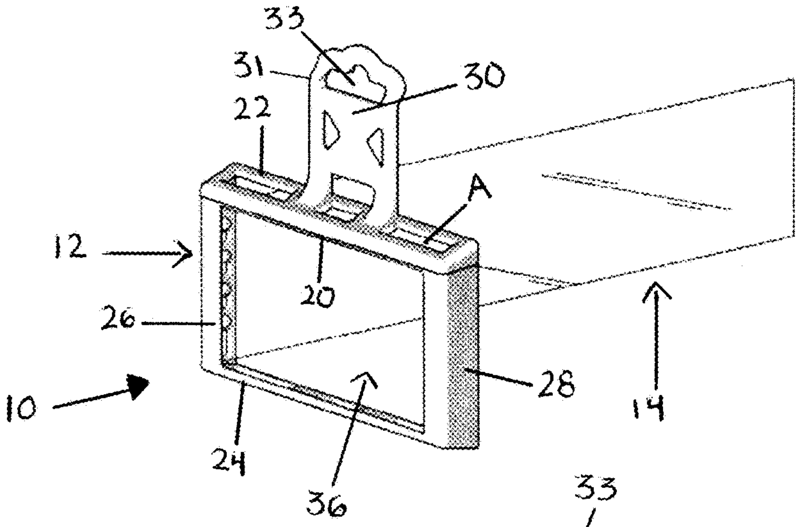
FIG. 1
FIG. 2
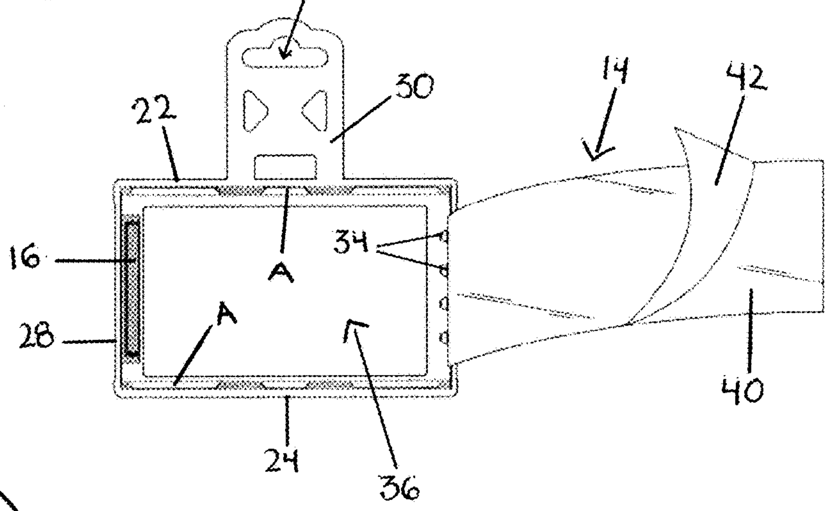
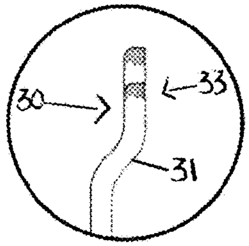
FIG. 3
FIG. 4B
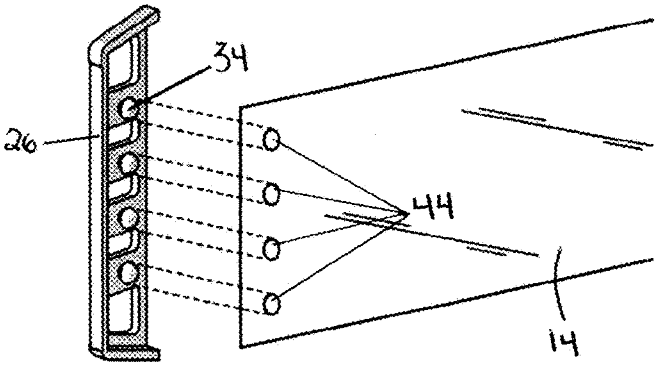
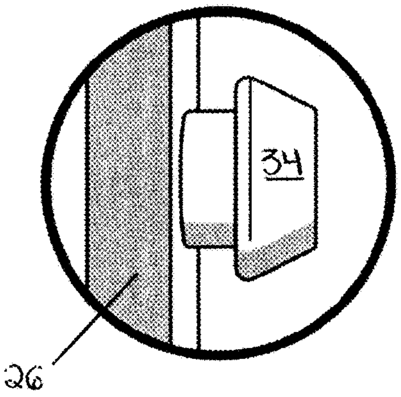
FIG. 4A FIG. 10A
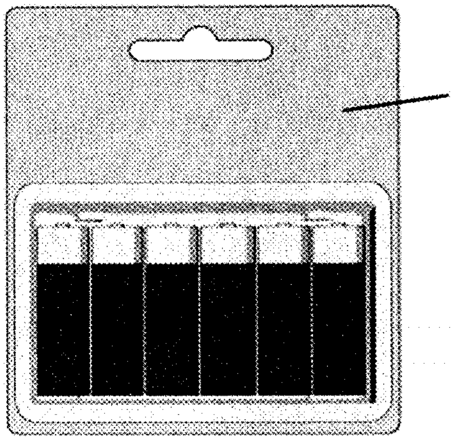
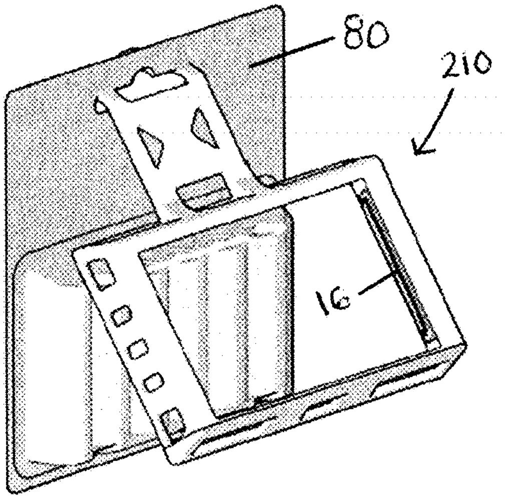
FIG. 10B
FIG. 10C
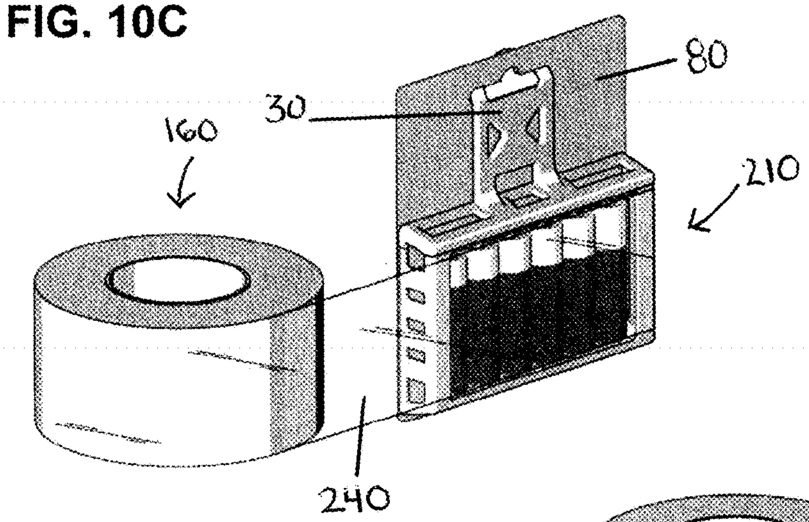
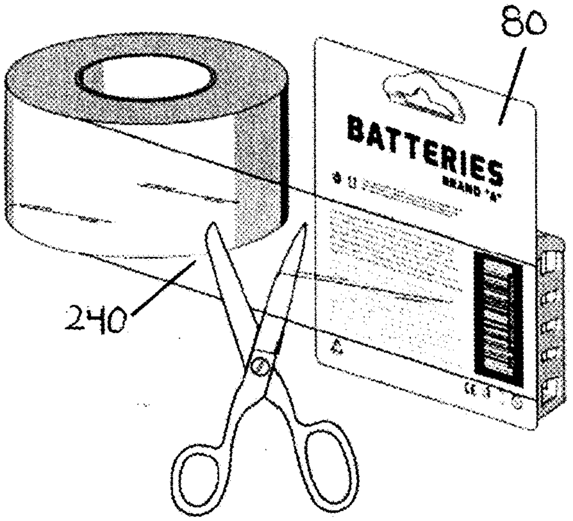
FIG. 10D

ELECTRONIC ARTICLE SURVEILLANCE AND SECURITY DEVICES

RELATED APPLICATIONS

This application claims benefit of U.S. provisional application Ser. No. 63/317,184, filed Mar. 7, 2022, entitled “Electronic Article Surveillance And Security Devices,” U.S. provisional application Ser. No. 63/238,568, filed Aug. 30, 2021, entitled “Electronic Article Surveillance Devices,” and PCT Application Serial No. PCT/US21/14577, filed Jan. 22, 2021, entitled “Electronic Article Surveillance Devices,” and which latter application claims benefit of U.S. provisional application Ser. No. 62/964,736, filed Jan. 23, 2020, entitled “Electronic Article Surveillance Labels,” which applications are incorporated herein by reference in their entirety.

FIELD OF THE INVENTION

The present invention relates to electronic article surveillance (EAS) devices and security devices. More particularly, the invention relates to keepers with means to be attached onto high value hard goods such as, but no limited to, battery packs, USB memory cards, razor blade packs, medicine boxes, perfumes, health-care items, wines, alcohols, DIY (Do It Yourself) accessories and the like (“Hard Goods”).

BACKGROUND OF THE INVENTION

EAS keepers and security devices (“Keepers”) are generally known in the art, including as disclosed, for example, in U.S. Pat. Nos. 6,676,175 and 7,095,327 which are incorporated herein by reference. Since the advent of Keepers in the 1980s, retailers have applied millions of these Keepers to Hard Goods in order to prevent shoplifting. Keepers initially emerged to protect very high value Hard Goods like CDs and audiocassettes where the traditional EAS (Electronic Article Surveillance) adhesive label was no longer effective as easily identified and neutralized by a shoplifter. Keepers have proven to be a very effective way of combatting shoplifting of high value Hard Goods but have always presented a number of challenges and drawbacks such as but no limited to:

1. Keepers are generally made of clear polycarbonate that is perfectly transparent when they are new but slowly get scratched when the store clerks remove them at the point of sales, pile them up and recirculate them to be used again and again. Progressively these scratches, including through the friction caused by one blister pack placed over another, become so serious they alter the visibility of the Hard Goods inside them and its inscriptions such as the barcode or important product information for medicines for example which slow the checkout process and impact revenue.

2. Keepers tend to accumulate dirt and dust as they can be used well over five years by a retailer making the visibility of a protected product even worse.

3. Keepers are by nature far bigger in total volume and size than the Hard Goods they are protecting as they encase the Hard Goods they protect and need means to be locked and unlocked which require additional volume. This additional volume is in general from 20 to 35% of the Hard Goods without the security Keepers which proportionally decreases the number of products to be displayed, thus impacting sales revenue for retailers as less product is displayed (20 to 35%) to the eyes of potential customers in a self-service environment.

4. Some product manufacturers such as batteries or razor blades purchase these keepers branded with their names to deliver them to specific retailers to help combat shrinkage and avoid retailers from locking their Hard Goods behind a counter that in turn kills sales revenues. These retailers use for example: Keepers purchased by manufacturer A to be used on their batteries for other products such as cosmetics from other brands as these Keepers are big enough to fit a large variety of high theft items. This creates a double problem for manufacturer A: its Hard Good will not be properly secured as many will be left without Keepers generating losses because shoplifting will increase and financial burden as manufacturer A purchased Keepers being used for other products and brands.

5. Some popular Keepers designed to secure Hard Goods such as batteries with a cardboard backing and razor blades packs do not encase the entire product package leaving out of the Keeper the upper flap of the package where the peg-hole is located and used to hang the packs on self-service display systems. The Keepers add extra weight for which the packs were not designed thus easily breaking and falling off the displays. Also, these peg-holes not being encased by the keeper make it easy for a shoplifter to break off the packs out of self-service display systems.

6. With the advent of self-checkouts in the retail environment, especially in super and hyper markets, Keepers are a nuisance as customers cannot remove them needing the assistance of a store sales clerk which goes in total opposition to the essence of a self-checkout where a customer is intended to checkout a product without store assistance.

7. Keepers are a very labor-intensive security device for retailers as they need to be removed at the checkout counter, sorted by type, recycled to the back of the store, sorted by model and used again to encase and secure a new Hard Good.

8. In the event a shoplifter succeeds in stealing a Hard Good inside a Keeper, he may purchase online a specific detacher device to remove the product from the Keeper without causing any damage to it thus making it very easy to resell on the black-market.

9. Retailers wishing to protect wine and spirits bottles need at least a small, a medium and a large Keeper to protect the immense variety of sizes and shapes that wine and spirits companies manufacture. This results in very important investments and headaches determining which Keeper best fits each specific bottle of wine and/or spirits. Retailers can also protect wine and spirits with adhesive rigid Keeper tags such as related in U.S. Pat. No. 7,095,327 which in opposition to the ones described just earlier are disposable but are quite easy to remove without tools as they present an easy grab and will cause unperceivable damage to wine and spirits bottles if forcibly removed as these were not designed to combat Organized Retail Crime (ORC). They were solely designed to shield the EAS label meant to trigger EAS gates at the exit of a retail store to a shoplifter. If a shoplifter steals a wine or spirits bottle with such rigid tag, it can be easily and totally removed at home without leaving marks or damage, thus being able to re-sell the product in the black market. Also, such tag when affixed on a product label or barcode will partially or totally shield the view of such product label or barcode as they were never thought to be transparent.

10. Retailers that wish to protect high theft items such as infant formula, beer, soda, food or deodorant which are sold in metal/aluminum/iron cans need to use very bulky and expensive re-usable EAS keepers as standard inexpensive EAS disposable labels when positioned on metal/aluminum/ iron cans do not trigger EAS gates installed after the point of sale as metal/aluminum/iron absorb the electromagnetic energy emitted by EAS gates. This results in leaving no option to retailers who wish to protect products sold in metal cans to use expensive and very labor intensive re-usable tags.

11. When retailers do not have EAS systems installed at their stores or have EAS systems that no longer properly function due to, for example, a lack of maintenance, the Keepers will no longer work to combat shoplifting as Keepers, as EAS labels are designed to trigger EAS systems at the entrances/exits of retail stores. In the beforementioned case, a shoplifter can easily withdraw a high value item inside a Keeper or protected by an EAS label or tag and leave the store without triggering an alarm. The shoplifter will then have the time to remove the Keeper or tag using high gauss magnets or tools and remove or simply leave the EAS label to either use the stolen product or resell it as a new one. In summary: Keepers are a good solution to combat theft but present numerous drawbacks affecting the shoppers purchasing experience and financial loses to retailers.

As seen above, the current Keepers for Hard Goods and other items have various shortcomings. An improved Keeper is highly desirable. These and other shortcomings of these known Keepers are addressed by the present invention.

SUMMARY OF THE INVENTION

In order to solve the above challenges with current Keepers, the invention is directed to an improved Keeper made of a rigid and generally transparent casing with a generally transparent adhesive means of attachment which can be used in conjunction with (1) known EAS labels, including RF and acousto-magnetic labels such as manufactured or sold by All-Tag Corporation USA and Sensormatic, a division of Johnson Controls USA; (2) RFID label inlays manufactured or sold by Avery Denison USA; and (3) non-EAS adhesive labels pre-printed with deterrent messages to: (a) deter shoplifters from stealing; (b) to deter buyers from buying stolen merchandise; and (c) to help law enforcement officers to recognize stolen goods.

A primary object of the present invention is to provide an improved EAS or non-EAS Keeper. The Keeper of the present invention is intended to include:

1. A casing made of a rigid or flexible material such as, but not limited to, polycarbonate plastic, acrylic plastic, thermoplastic styrene-butadiene copolymer (SBC) plastic, non-transparent ABS plastic or an eco-friendly biodegradable material that will not totally encase a product or product packaging (collectively "product") as a traditional Keeper would do. The Keeper is designed to, in general, be positioned on the front side of a product over the product label and/or the location on a packaging where the Hard Good is visible or accessible, circling the peg-hole hook of the packaging when applicable or over the area(s) where a Hard Good product packaging is to be opened by a consumer. The Keeper structure may alternatively be positioned to the back, right or left side of a product but will not fully encase it where if removed would permanently damage the product or the product's label.

2. A flexible and generally transparent support permanently attached to the Keeper with a strong glue meant to be wrapped around the product and the Keeper casing to hold the Keeper structure securely attached to a product preventing a shoplifter from removing it by hand or accessing the area where the Hard Good, the EAS label or the non-EAS label are located. The flexible support may have a peel-off paper for ease of application and pre-printed instructions and/or warning messages and/or a printed/opaque area to mask selective areas of the product.

3. At least one RF and/or AM EAS label and/or RFID inlay and/or a non-EAS printed label is affixed to the Keeper casing and/or to the flexible support.

Another primary object of the invention is to provide an improved Keeper for use with high value Hard Goods including semi-sharp teeth on its perimeter to make the removal of the improved Keeper extremely difficult without the use of a hand tool as the teeth may hurt a shoplifter's fingers when trying to forcibly remove the improved Keeper in a retail store.

Another primary object of the invention is to provide an improved Keeper for use with high value Hard Goods including semi-sharp teeth on its perimeter surrounded by a security detachable frame with no sharp edges to make the removal of the improved Keeper extremely difficult without the use of a hand tool as the teeth may hurt a shoplifter's fingers when trying to forcibly remove the improved Keeper in a retail store. The detachable frame will protect an honest customer from involuntarily hurting herself by shielding the semi-sharp teeth. In the event a shoplifter tries to remove the improved Keeper, the detachable frame surrounding the semi-sharp teeth will be the first to detach exposing the semi-sharp teeth that can cause injury if excess force is applied in attempting to remove it.

Another primary object of the invention is to provide an improved Keeper which does not include a locking mechanism and, therefore, the Keeper will not be required to be removed at the point of sale. Upon checkout the de-activatable EAS label or re-programmable RFID inlay when applicable will be deactivated or turned-off to allow a paying customer to leave the store without triggering the EAS Security Gates when applicable. This feature will save substantial time and money to retailers and will allow customers to pay using self-checkouts without the assistance of sales staff to unlock or remove the Keepers, thereby expediting the checkout process. The paying customer will then remove the improved Keeper at home when needed, using for example, a pair of scissors. In the event the improved Keeper does not carry an EAS label, a paying customer can walk out the store with its purchase ticket which proves the product was paid for.

Another primary object of the invention is for the improved Keeper and its attached flexible transparent support to destroy the product's packaging and/or product brand label when forcibly removed to extract the product inside it or use the product to avoid a shoplifter from reselling it on the black market. This feature will deter shoplifting, will help the fight against ORC and will help law enforcement officers to locate stolen goods.

Another primary object of the invention is to provide an improved Keeper that adds a minimal additional volume to a Hard Good or its packaging when affixed to it. In opposition to traditional Keepers which add 15 to 30% more volume, the Keeper of the invention will not impact the number of products on display in a self-service environment. This feature will increase sales as more Hard Goods will be exposed in comparison to traditional Keepers.

Another primary object of the invention is to provide an improved Keeper that in addition to the above-mentioned improvements brings a physical reinforcement to the peg-hole of a carboard package to deter a shoplifter from pulling a Keeper with a cardboard package off a store display by tearing it off (breaking the cardboard peg-hole). This reinforcement will be most effective on secured store displays such as the T100 or Helix device from In-View Systems, a Charlotte, North Carolina company, that prevents a shoplifter from pulling out several items at the same time from a display system. This feature will help reduce theft.

Another primary object of the invention is to provide an improved Keeper that in addition to the above-mentioned improvements brings a physical reinforcement to the opening(s) of a product packaging to deter a shoplifter opening a package inside a store to extract goods inside the store and then leave an empty or partially empty package that may be purchased by an honest customer.

A variant of the invention is to provide an improved Keeper that perfectly matches the geometry/morphology of a specific section of a specific Hard Good packaging thus reducing the possibility of it being used on other Hard Goods it was not designed for. As an example: an improved Keeper can be made to match the geometry/morphology of a pack of AA batteries of Brand A that would not match the geometry/morphology of a pack of AA batteries of Brand B as for example the peg-hole of the AA battery pack of Brand B would be obstructed by the Keeper made for Brand A.

A variant of the invention is to provide an improved Keeper that matches the geometry/morphology of a specific Hard Good A and includes a very specific opaque printing area on its clear flexible support that would mask very specific information of a very similar Hard Good B which would make Hard Good B in a Keeper for Hard Good A very difficult or impossible to sell. As an example: an improved Keeper can be made to match the geometry/morphology of a pack of AA batteries of Brand A whereas the opaque printing area does not mask important information when wrapped around it but when used on a very similar pack of AA batteries of Brand B would partially or totally mask the barcode or other critical information making it very difficult or impossible to sell as the barcode will not be read by the barcode reader at the checkout point and/or critical legal information will be masked.

The invention is directed to an improved Keeper comprising a rigid casing that substantially corresponds to the shape of a product and adapted to cover at least one side of the product but not fully enclosing the product; a security element or a non-EAS printed label attached to the casing and adapted to be inaccessible to a consumer when the Keeper is attached to the product; and a flexible adhesive support attached to the casing and adapted to wrap around the product.

The invention is further directed to a Keeper comprising a rigid casing that substantially corresponds to the shape of a product and adapted to cover at least one partial side of the product but not fully enclosing the product; a security element or a non-EAS printed label attached to the casing and adapted to be inaccessible to a consumer when the Keeper is attached to the product; and a two-sided adhesive extending around the perimeter of the casing, one side of the two-sided adhesive attached to the casing and the second side of the two-sided adhesive adapted to attach to the product to secure the Keeper to the product.

The invention is further directed to a Keeper comprising a rigid or semi-rigid casing that substantially corresponds to the shape of at least a portion of a product and adapted to cover at least part of a portion of the product but not fully enclosing the product; a security element or non-EAS printed label attached to the casing and adapted to be inaccessible to a consumer when the Keeper is attached to the product; and a two-sided adhesive is attached to the casing, one side of the two-sided adhesive attached to the casing and the second side of the two-sided adhesive adapted to attach to the product to secure the Keeper to the product.

The invention is further directed to a Keeper comprising clips and alignment pins in order to hold the Keeper onto a product before wrapping the strong transparent adhesive means of attachment around the product in a specific alignment between the alignment pins to avoid mispositioning the transparent adhesive means and needing to reposition the transparent adhesive means which can damage the product label.

The invention is further directed to a disposable Keeper that will be able to protect products sold in metal/aluminum/iron containers that, when applicable, can properly trigger EAS gates if the EAS and/or RFID label(s) are not deactivated at the point of sale.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 1 is a perspective view of the improved Keeper of the present invention with an AM label.

FIG. 2 is a back view of the improved Keeper of FIG. 1 having the flexible adhesive support with its pre-cut holes connected to arrow shape barbs and the AM label.

FIG. 3 is an enlarged side view of the top of the Keeper of FIG. 1.

FIG. 4A is a partial view of a side wall of the Keeper of FIG. 1 showing the arrow shaped barbs and the connection to the flexible adhesive support having perforations.

FIG. 4B is an enlarged side view of the arrow shaped barb of FIG. 4A.

FIGS. 8A-8D show a comparison of use of the Keeper of FIG. 1, wherein FIGS. 8A and 8B show the improved Keeper in place on Brand A protecting the peg-hole from being broken and FIGS. 8C and 8D show the same Brand A product without the improved Keeper allowing it to be broken by a shoplifter.

FIGS. 10A-10D represent an alternative method of attaching the improved Keeper to a product wherein a standard roll of clear tape is used instead of the flexible adhesive support.

Referring to FIG. 11A, the top Keeper has a peg-hole for a product with a peg-hole. FIG. 11B is similar to 11A but the two Keepers are the same and the top Keeper does not have a peg-hole.

DETAILED DESCRIPTION OF THE PREFERRED EMBODIMENTS

Figure 5A:
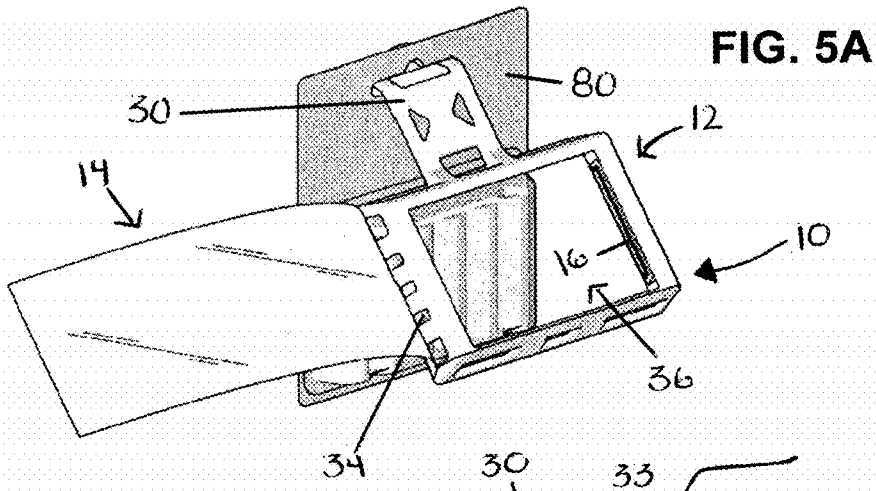
FIGS. 5A-5D are views of the Keeper of FIG. 1, with an AM label, being attached to a product and showing the steps of attaching the Keeper to the product.

Referring to FIGS. 1-4, there is shown the improved Keeper 10 comprising a rigid casing 12, a flexible adhesive support 14 affixed to the casing 12 via the pre-cut perforations on the flexible support 14 and the arrow shape barbs on the casing 12 as described below. The casing 12 includes a security device 16.

The casing 12 includes a frame 20 which may be of different shapes to conform to the Hard Good upon which the Keeper 10 is to be attached. The frame 20 shown in FIGS. 1-4 is rectangular as this is a common shape of Hard Good products. Frame 20 includes a top wall 22, bottom wall 24 and side walls 26, 28. Extending from top wall 22 is an upwardly extending support 30. Support 30 includes an elbow 31 which allows the support to be placed through a Hard Good product peg-hole as shown, for example, in FIGS. 5 and 6. Support 30 includes an opening 33 which corresponds to a Hard Good package peg-hole for hanging the Hard Good product on a display rack in a store.

Referring to FIGS. 4A and 4B, the frame 20 side wall 26 may include arrow shaped barbs 34 for attachment of flexible adhesive support 14 as discussed below. Referring to FIG. 2, side wall 28 is adapted to receive a security element 16 which may be adhered to side wall 28 by any suitable means such as an adhesive. The security element 16 is not accessible to consumers such that it cannot be removed and preferably cannot be seen. Case 12 may include one or more apertures A in the walls to provide for a lighter weight Keeper and to require less material in the manufacture of the Keeper, thereby saving cost in manufacture.

Frame 20 further includes an open window 36 shown, for example, in FIGS. 1 and 2. This represents an area of the rigid casing 12 with no material and which matches the geometry and the position of the Hard Good. The Keeper 10 thereby reduces the total amount of material required and produces a lighter and cheaper antitheft solution. The Keeper 10 fits in place to surround a product 80.

The rigid casing 12 may be manufactured from a transparent material such as, but no limited to, polycarbonate plastic; a non-transparent ABS plastic; or an eco-friendly biodegradable material. While the preferred embodiment is for casing 12 to be transparent, a translucent or an opaque casing may be used, including a casing using the trade dress of the Hard Good product to be secured.

The flexible adhesive support 14 comprises a clear tape 40 with a strong glue and a peel-off paper backing 42. The clear adhesive tape 40 is meant to wrap around the package of a product and the Keeper 10 to hold all together by the strong glue of tape 40. Support 14 further includes a plurality of perforations 44 for mating with arrow barbs 34 and attaching the support 14 to casing 12.

The flexible support 14 may be manufactured from a clear plastic material such as, but not limited to, polypropylene or an eco-friendly biodegradable material. A presently preferred strong glue on tape 40 is UPM Permanent adhesive that will destroy printed matter on the back of a product's packaging if removed by a shoplifter, making the product hard to resell.

The security element 16 may include one or a combination of an EAS label; an antenna; or a security device or electronic label such as an RFID element/antenna for the purpose such as, but not limited to, one or multiple traceability, merchandising, marketing, pricing or inventory purposes.

Referring to FIGS. 1 and 2, there is disclosed a presently preferred shape and dimensions of the improved Keeper 10. However, it is understood that other shapes and dimensions may be utilized without departing from the scope of the invention. Specifically, the improved Keeper 10 of the invention preferably will correspond to the shape of the Hard Good being secured, including, but not limited to, rectangular, square, oval or the like.

Figure 5B:
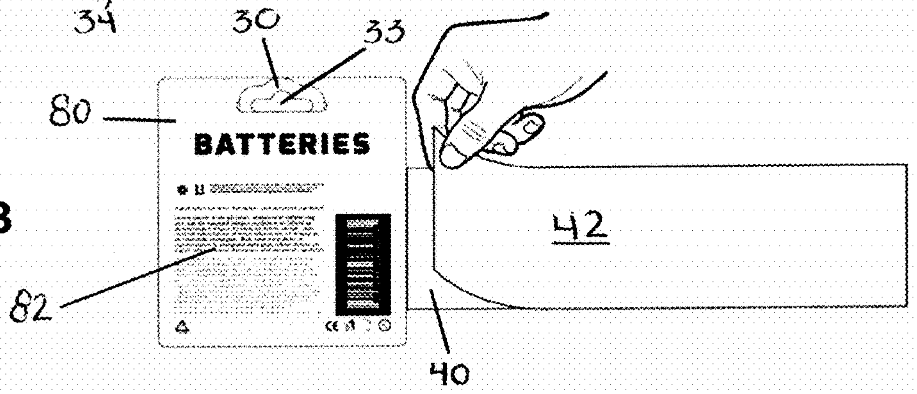
Figure 5C:
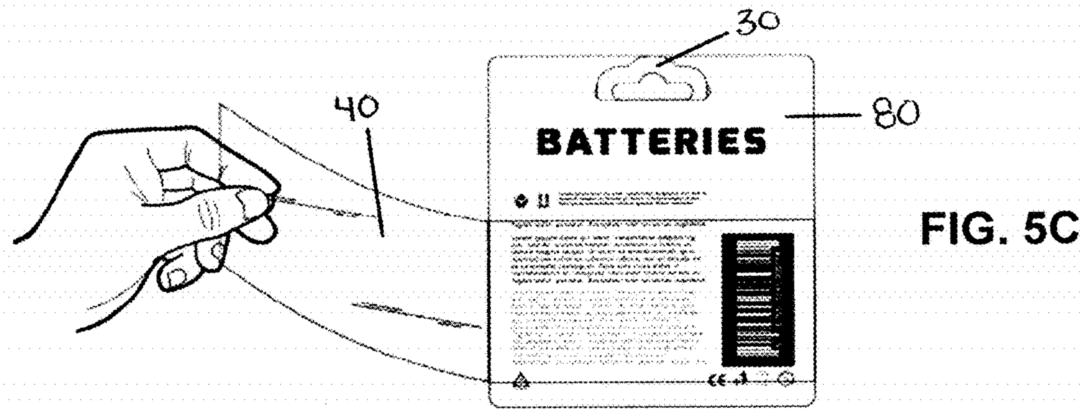
Figure 5D:
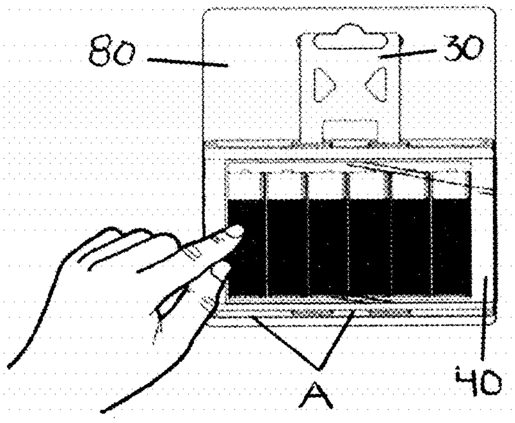

FIGS. 5A-5D show a pack of batteries 80 secured with an improved Keeper 10 having an acousto-magnetic label 16 wherein the transparent flexible adhesive tape 40 is wrapped around the pack of batteries 80. After the product 80 has been wrapped, the batteries are no longer accessible without forcing the package open. The strong permanent adhesive on transparent tape 40 will destroy the printed material 82 on the pack of batteries 80 if forcefully removed. Referring to FIG. 5A, there is shown the Keeper 10 being attached to a package of batteries 80. Support 30 is placed through the peg-hole of the batteries 80. The flexible adhesive support 14 is pulled out and away from the casing 12. Referring to FIG. 5B, support 30 is seen through the peg-hole of batteries 80 and the top thereof is adjacent to the top of the batteries 80. Peel-off layer 42 is pulled back from flexible adhesive support 14 exposing tape 40 with the strong permanent adhesive. Referring to FIG. 5C, the clear tape 40 is wrapped around the back of the battery pack 80 and all product information may be read and does not cover it. Referring to FIG. 5D, the clear tape 40 is now completely wrapped around the battery pack and covering the open area 36 of casing 12 and the Keeper is fully attached to the battery pack 80 and the Keeper and the battery pack 80 constitute one unitary product. Thereafter, a customer may purchase the battery pack 80 at a cashier with the barcode, as shown in FIGS. 5B and 5C, visible for a cashier to scan the product. Similarly, at the checkout, the AM security element 16 may be deactivated by the cashier and the customer takes the product home. The customer thereafter may remove or cut the clear tape 40.

Figure 6A:
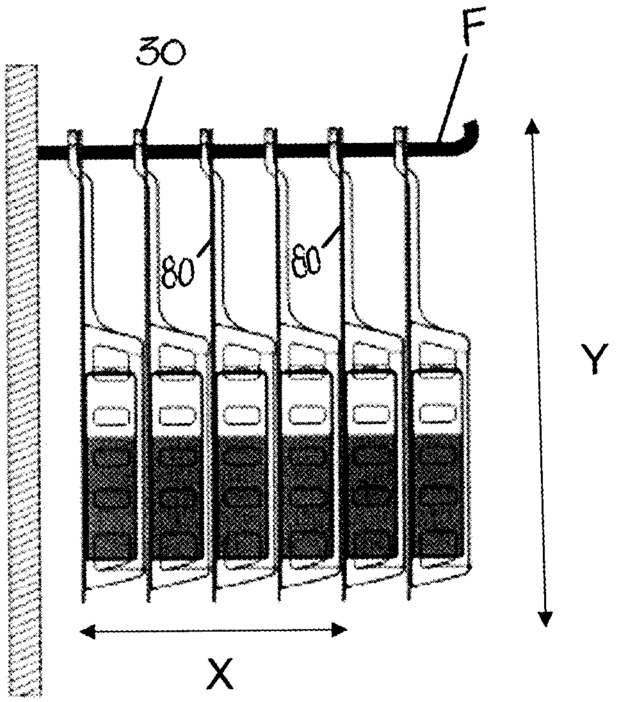
FIGS. 6A and 6B represent a comparison of an identical product on display using the improved Keeper of FIG. 1 in FIG. 6A wherein X and Y for four products is less than X' and Y' of FIG. 6B using a prior art Keeper because the improved Keeper requires less space on a retail display.
Figure 6B:
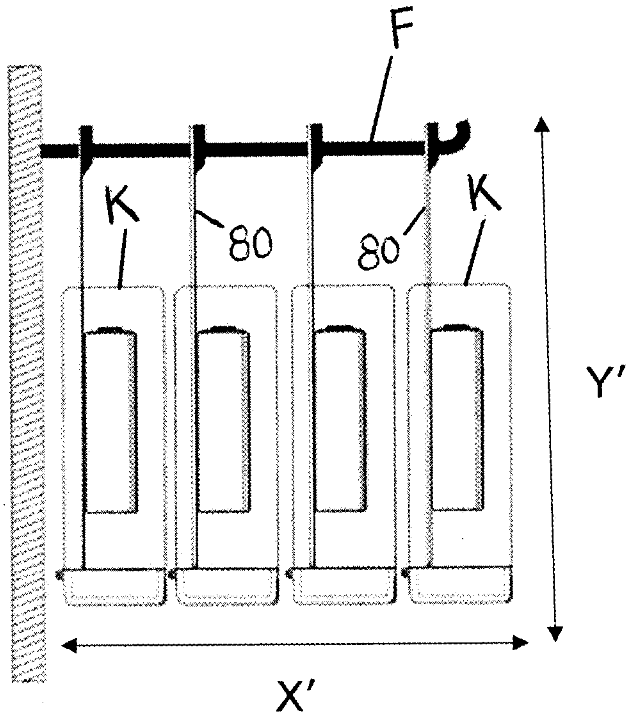

FIGS. 6A and 6B show a comparison of Keeper 10 in FIG. 6A and prior art Keepers K in FIG. 6B. FIG. 6A shows a series of improved Keepers 10, protecting a series of identical battery packs 80 hanging off a retail display fixture F. FIG. 6B shows display fixture F with identical battery pack 80 in a prior art Keeper K. The lines X and Y in FIG. 6A will always be less for the same number of products than the lines X' and Y' in FIG. 6B as the new improved Keeper 10 will need less space on retail display fixtures F. For the same quantity of battery packs 80, typically, X with the improved Keeper will be from 15 to 30% less than X' with the prior art Keepers and Y will be from 5 to 15% less than Y'.

Figure 7A:
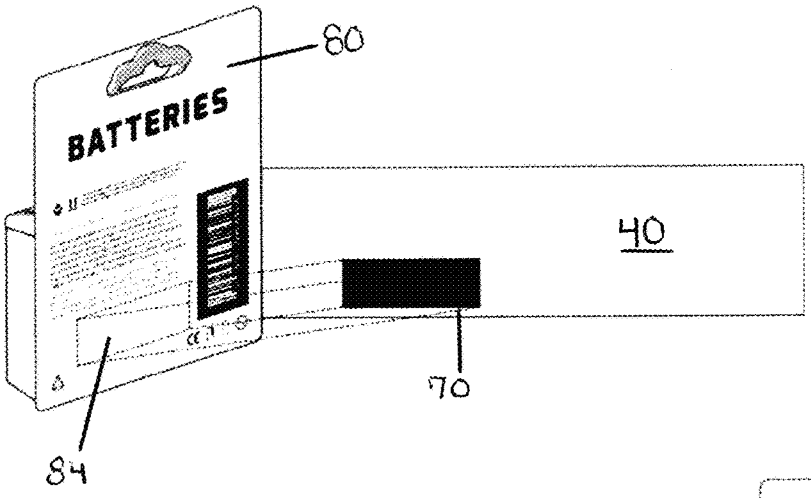
FIGS. 7A-7D show the improved Keeper of FIG. 1 affixed to two similar products from two different brands wherein the improved Keeper has a pre-defined cover-up print section designed to selectively mask information to guarantee that a specific improved Keeper with a specific pre-defined cover-up area will only be usable on a specific product from a specific brand.
Figure 7B:
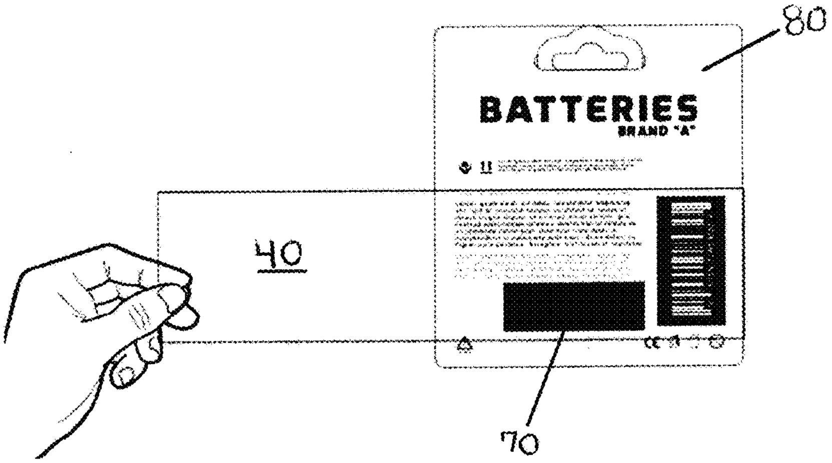
Figure 7C:
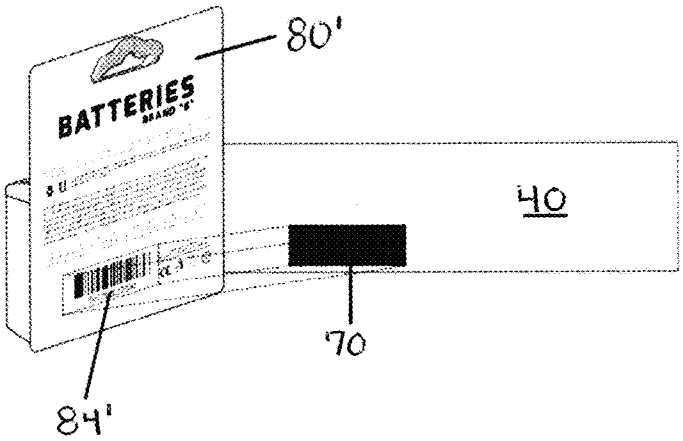
Figure 7D:
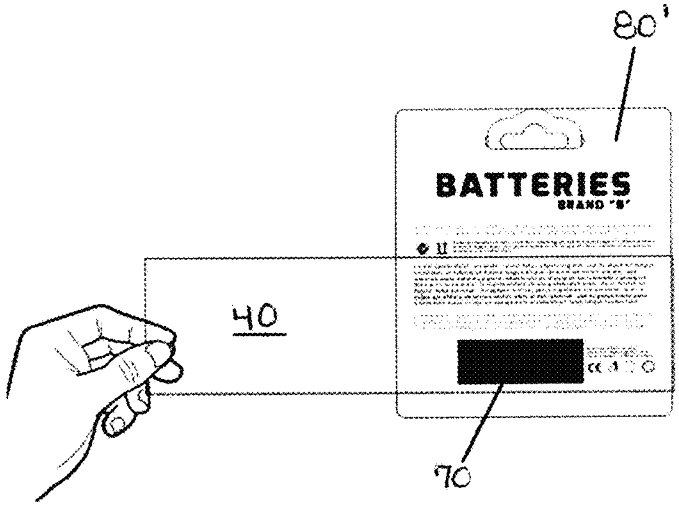

FIGS. 7A-7D represent the improved Keeper 10 affixed to product 80 from Brand A and product 80' from Brand B, wherein the transparent adhesive tape 40 of support 14 has one or more pre-defined cover up sections 70. Referring to FIGS. 7A and 7B, cover up section 70 does not mask any critical information of the section 84 of the product 80 from Brand A. FIGS. 7C and 7D show the same improved Keeper 10 and the same transparent adhesive tape 40 of support 14 on product 80' from Brand B similar to Brand A, wherein the same clear adhesive tape 40 of support 14 has the same pre-defined cover up printed section 70 that masks critical information 84' of the product 80', thus product 80' of Brand B cannot be sold with Keeper 10 designed for Brand A as the critical information, e.g. a barcode, is covered and cannot be scanned.

Figure 8A:
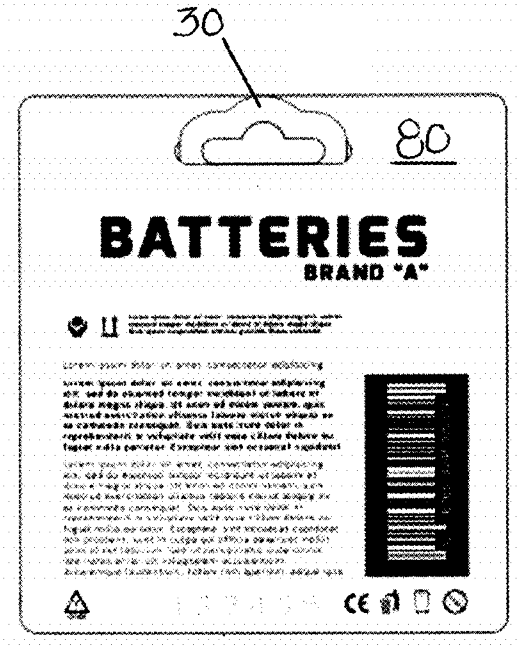
Figure 8B:
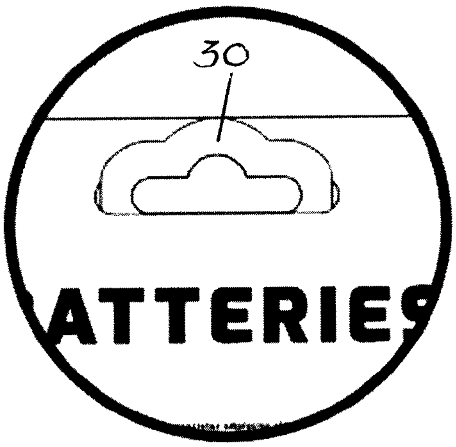
Figure 8C:
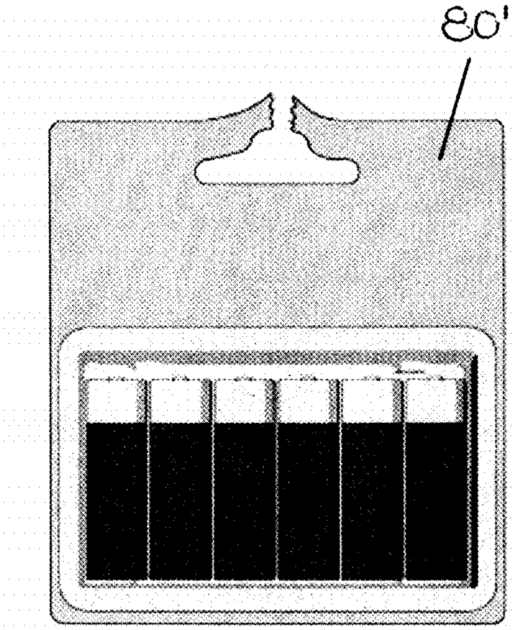
Figure 8D:
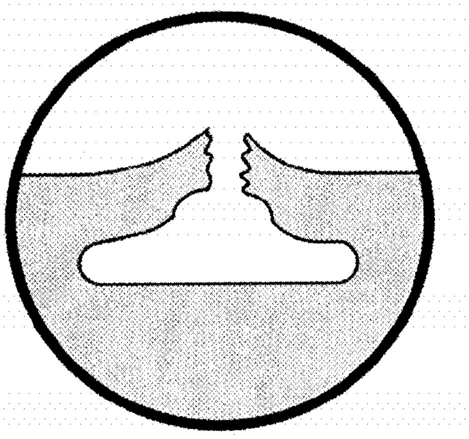

FIGS. 8A and 8B show the improved Keeper 10 upper section 30 of the casing 12 perfectly fitting/matching the area of the product 80 packaging peg-hole in order to meet two criteria: (1) the upper section 30 of the casing 12 matches the peg-hole of the Brand A's packaging; and (2) the upper section 30 reinforces the peg-hole typically made of cardboard in order to keep shoplifters from pulling/ripping out one or several products from a retail display fixture by breaking the cardboard peg-hole from product 80' as shown in FIGS. 8C and 8D.

Figure 9A:
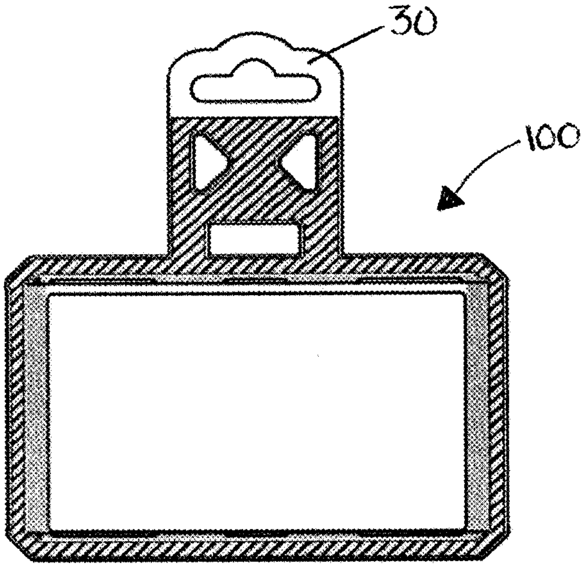
FIGS. 9A-9C represent an alternative means of attachment for the improved Keeper wherein the flexible adhesive support is replaced by a double-side glue label to protect the product on one side only.
Figure 9B:
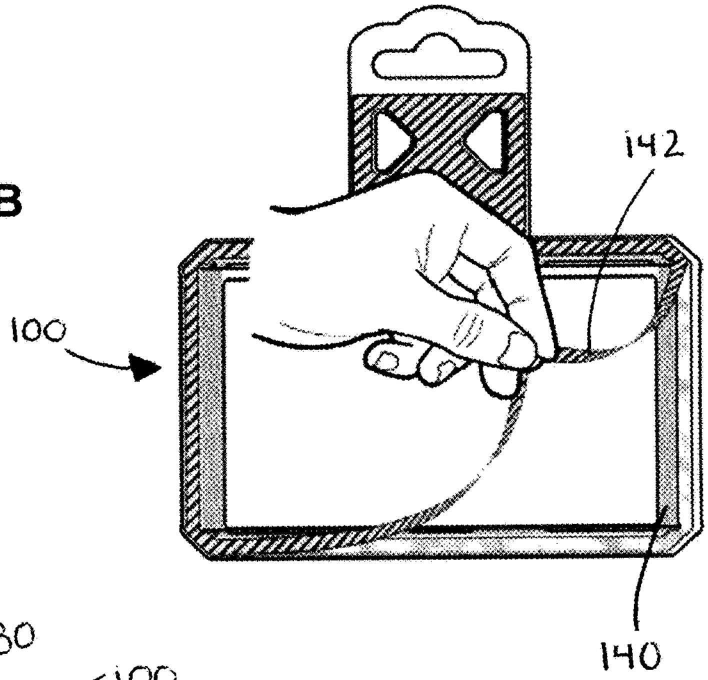
Figure 9C:
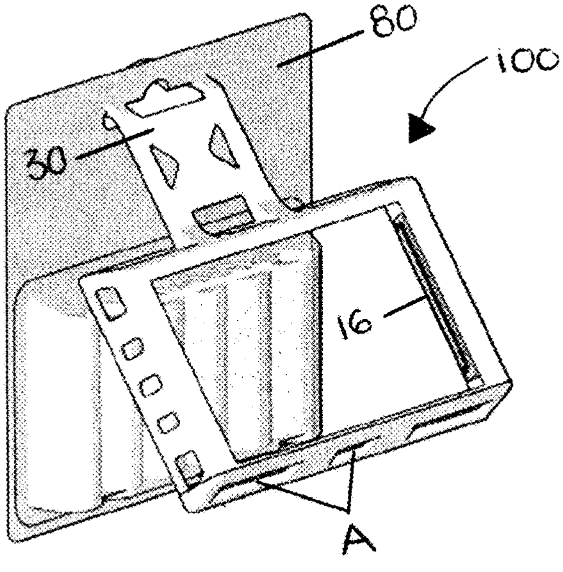

FIGS. 9A-9C represent an alternative means of attachment for another embodiment of the improved Keeper 100 wherein the flexible adhesive support 14 is replaced by a double-sided glue 140 with peel-off paper 142. The glue 140 is located on the perimeter of the improved Keeper 100 in order to attached it onto a product 80 protecting only one side of the product 80. FIG. 9C represents this alternative embodiment 100 with the peel-off paper 142 totally removed and in the process of being glued onto the product packaging 80. The other parts of Keeper 100 are substantially the same as Keeper 10.

FIGS. 10A-10D show an alternative Keeper 210 which is substantially similar to Keeper 10 except that it does not include the flexible adhesive support 14. The Keeper 210 is attached to the product 80 using a standard roll of clear tape 160 as shown in FIGS. 10A-10D. Referring to FIG. 10A, there is shown a package of batteries 80. Referring to FIG. 10B, there is shown a Keeper 210 with support 30 placed through the peg-hole of the batteries 80. Referring to FIGS. 10C and 10D, the clear tape 240 is wrapped around the front and then the back of the battery pack 80. All product information may be read and is not covered. Referring to FIG. 10D, the clear tape 240 is now completely wrapped around the battery pack and a scissors or similar instrument are used to cut the excess clear tape 240. Thereafter, a customer may purchase the battery pack 80 at a cashier with the barcode, as shown in FIG. 10D, visible for a cashier to scan the product. Similarly, at the checkout, the AM security element 16 may be deactivated by the cashier and the customer takes the product home. The customer thereafter may remove or cut the clear tape 142.

Figure 11A:
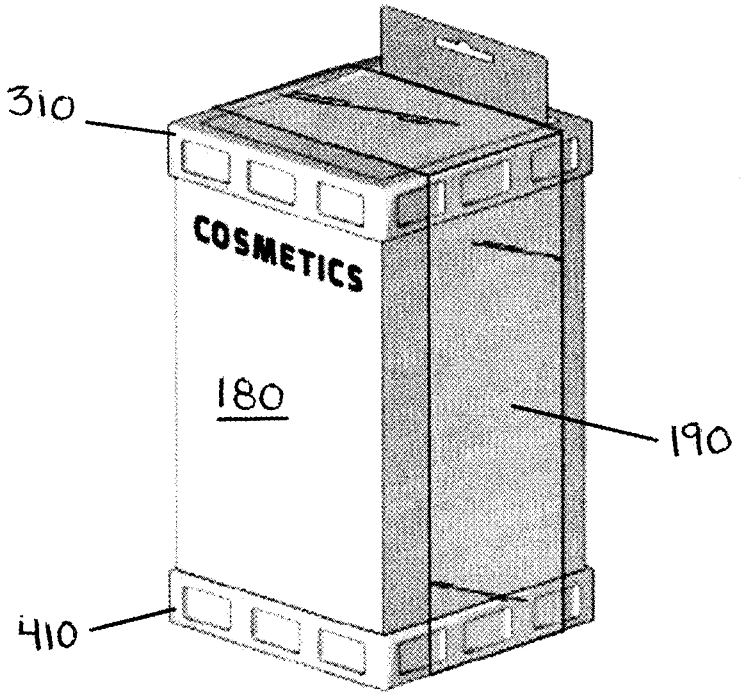
FIG. 11A-11B illustrate two improved Keepers on a product, one on the top and one on the bottom.
Figure 11B:
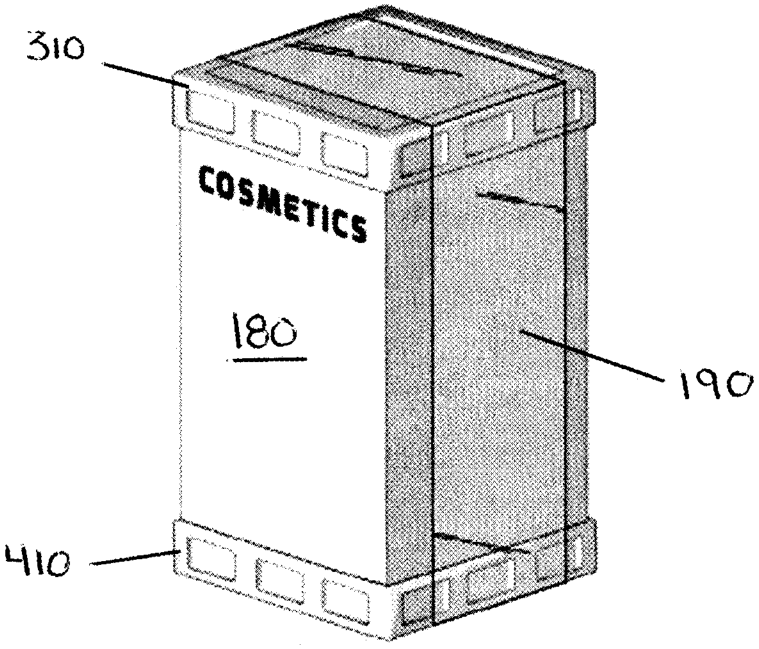

FIGS. 11A and 11B illustrate the use of two Keepers 310 and 410 at the top and bottom of a Hard Good 180 and a clear adhesive member 190 is wrapped around the Hard Good to hold the Keepers 310 and 410 in place. FIG. 11A shows Keeper 310 having a peg-hole for holding the Hard Good. FIG. 11B shows the Keeper 310 without a peg-hole.

Figure 12A:
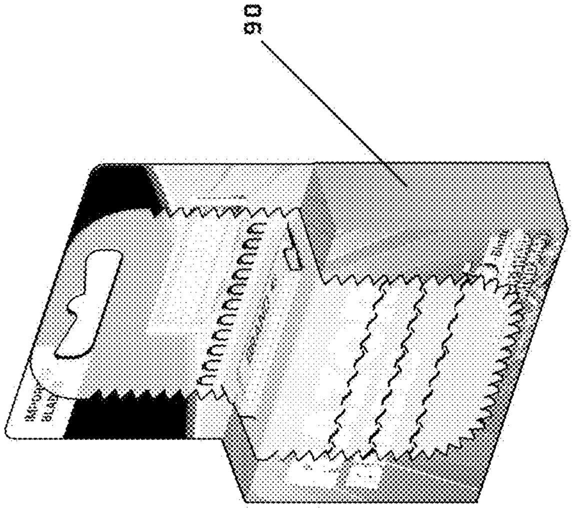
FIGS. 12A-12H represent an alternative improved Keeper with alternative means of attachment wherein the flexible adhesive support is replaced by two double-sided glue labels to protect the product on one side only showing an alternative method of attaching the AM label to the improved Keeper and showing pre-determined grooved sections that fragilize the improved Keeper to create breaks if forced.
Figure 12B:
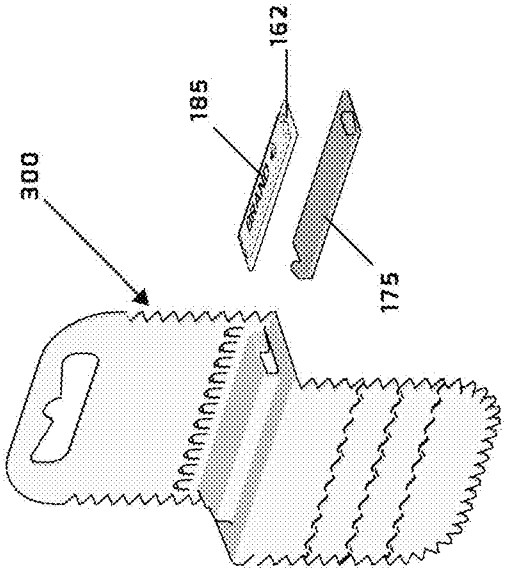
Figure 12C:
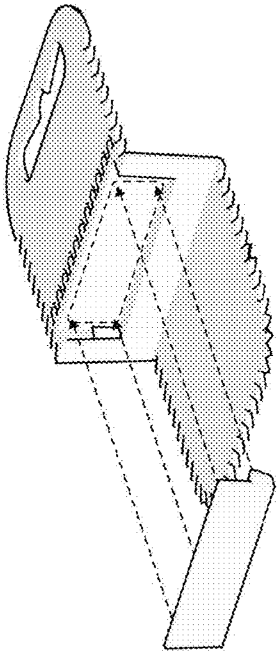
Figure 12D:
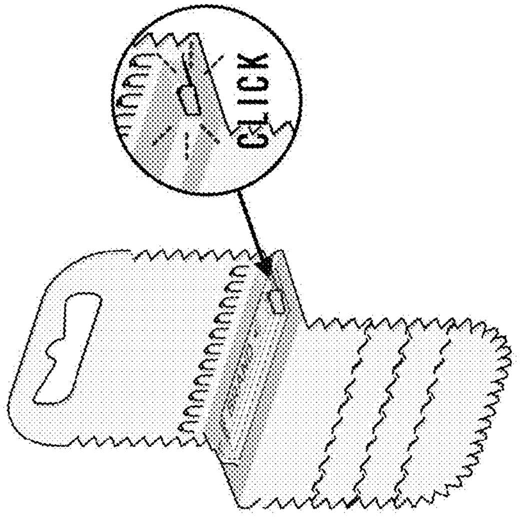
Figure 12E:
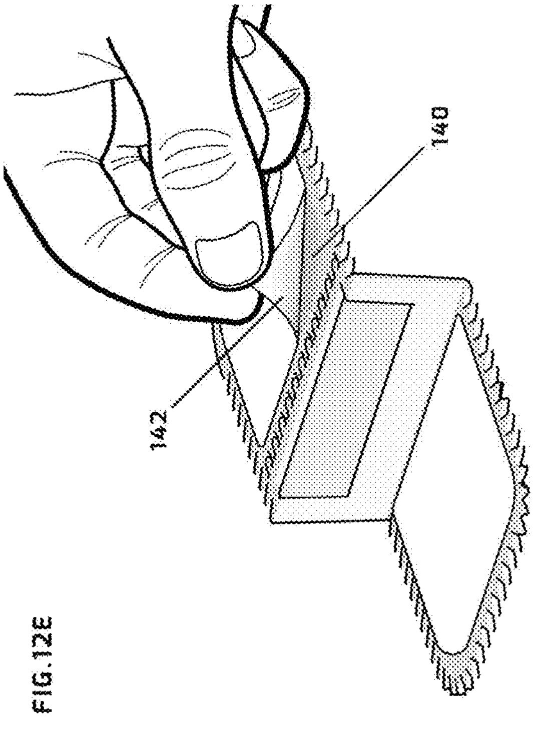
Figure 12F:
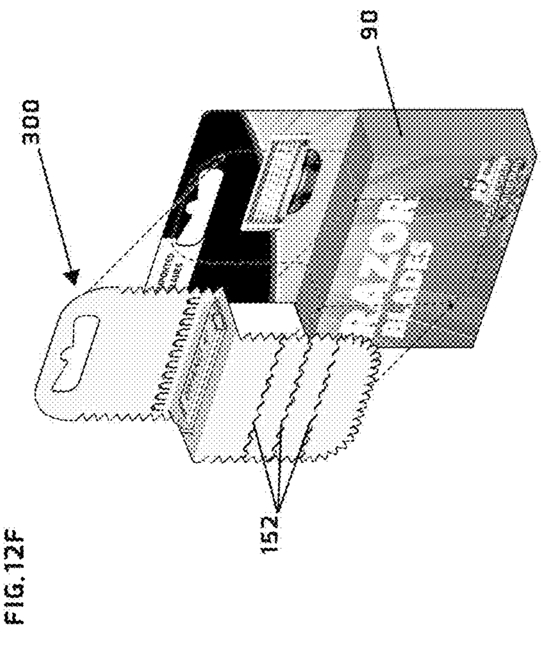
Figure 12G:
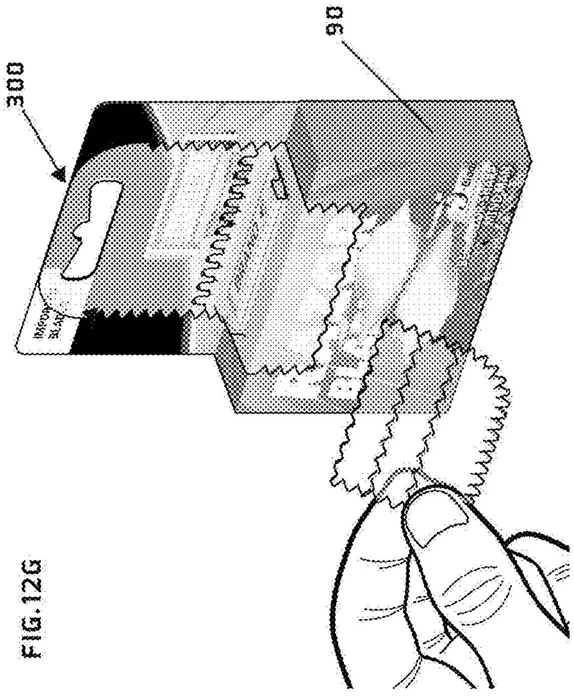
Figure 12H:
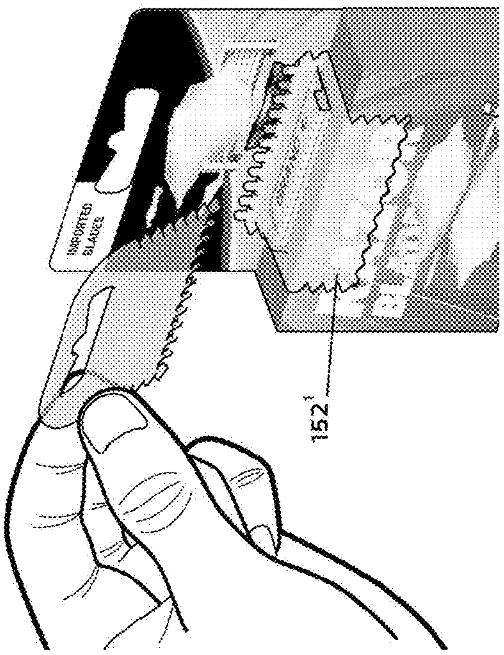

FIGS. 12A-12H represent an alternative means of attachment for another embodiment of the improved Keeper 300 made of a thin rigid plastic material, e.g. 1 mm in thickness. The flexible adhesive support 14 of the prior discussed Keepers is replaced by a double-sided glue 140 with peel-off paper 142. One side of glue 140 is attached to Keeper 300 and a second side of glue 140 will be attached to product 90. The second side of glue 140 covers most of the surface of the improved Keeper 300 in contact with a product 90 in order to attach Keeper 300 to the product 90. FIG. 12F shows Keeper 300 with the peel-off paper 142 totally removed and in the process of being glued onto the product packaging 90. FIGS. 12B-12D represent an alternative way to affix the EAS label 162 on the Keeper 300 to allow the pre-printed area of an EAS label 185 to be seen by a customer and/or shoplifter. The label 162 is first glued onto the plastic drawer 175 by means of its self-adhesive double-sided glue, the drawer 175 with the EAS label is then fastened by clip-on onto the Keeper 300. The EAS label will remain out of access to a shoplifter at all times. FIGS. 12F-12H shows the Keeper 300 with pre-determined grooves 152 on its surface created during the plastic injection process and designed to break when forced as shown at 152'. FIG. 12G shows how the improved Keeper 300 damages the printed material of the product packaging 90 if foreseeably removed.

Figure 13A:
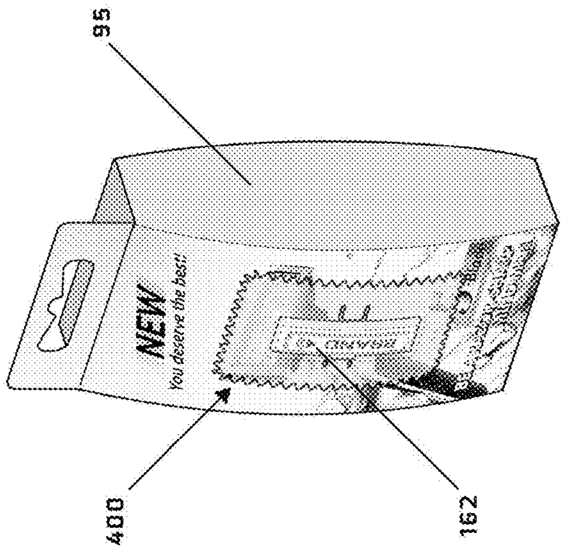
FIGS. 13A-13D represent an alternative semi-rigid improved Keeper with alternative means of attachment wherein the flexible adhesive support is replaced by one double-sided glue label to protect the product on one side only showing an alternative method of attaching the AM label to the improved Keeper using an extra plastic clip-on drawer.
Figure 13B:
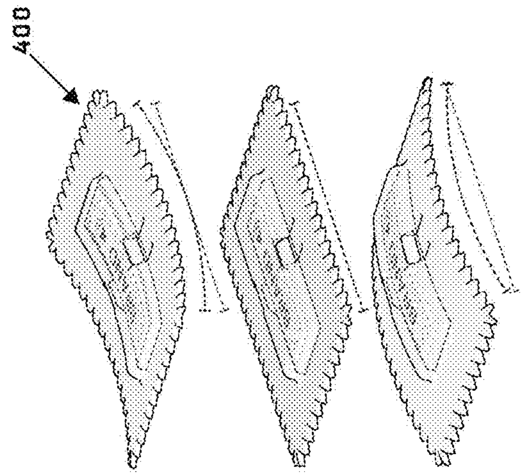
Figure 13C:
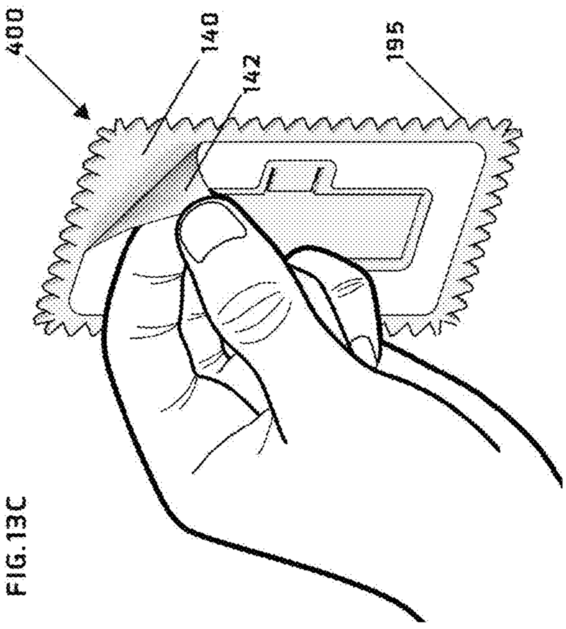
Figure 13D:
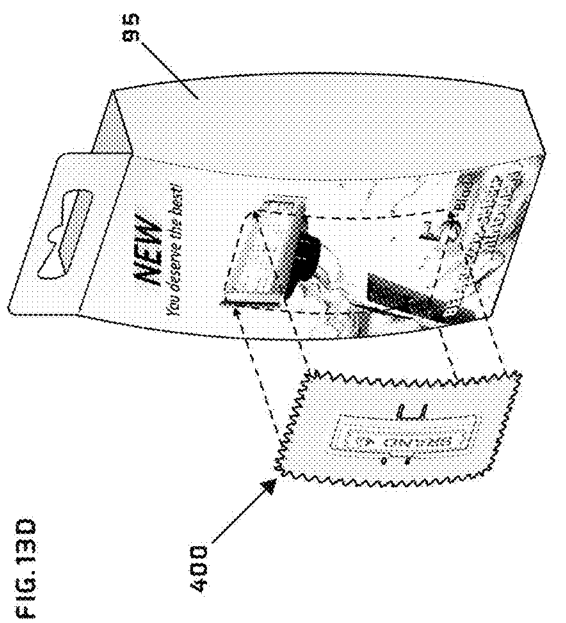

FIGS. 13A-13D represent an alternative means of attachment for another embodiment of an improved semi-rigid plastic Keeper 400 wherein the adhesive support 14 of the prior Keepers is replaced by a double-sided glue 140 with peel-off paper 142. The glue 140 is located on most of the surface of the improved Keeper 400 that makes contact with the product 95 in order to attach it to the product 95, thereby protecting one side of the product. FIG. 13D shows Keeper 400 with the peel-off paper 142 totally removed and in the process of being glued onto the product packaging 95. FIG. 13A shows Keeper 400 in place on the product packaging 95 showing the EAS label's pre-printed area 162 can be seen by a customer or shoplifter. FIG. 13B shows Keeper 400 preferably made of flexible clear plastic showing a certain latitude to adapt to oval or concave product packages or products. FIG. 13C shows the Keeper 400 with slightly sharp teeth 195 around its perimeter in order to make it harder for a shoplifter to remove the Keeper 400 from the product packaging 95 as the teeth will tend to harm a shoplifter's fingers.

Figure 14B:
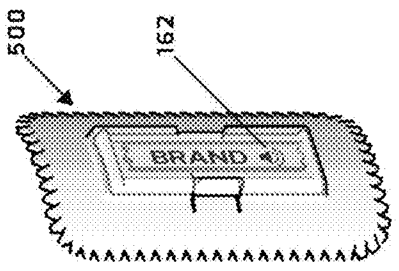
FIGS. 14A-14D represent an alternative concave improved Keeper to protect rounded products such as bottles with alternative means of attachment wherein the flexible adhesive support is replaced by one double-sided glue label to protect the product on one side only showing an alternative method of attaching the AM label to the improved Keeper using an extra plastic clip-on drawer.
Figure 14D:
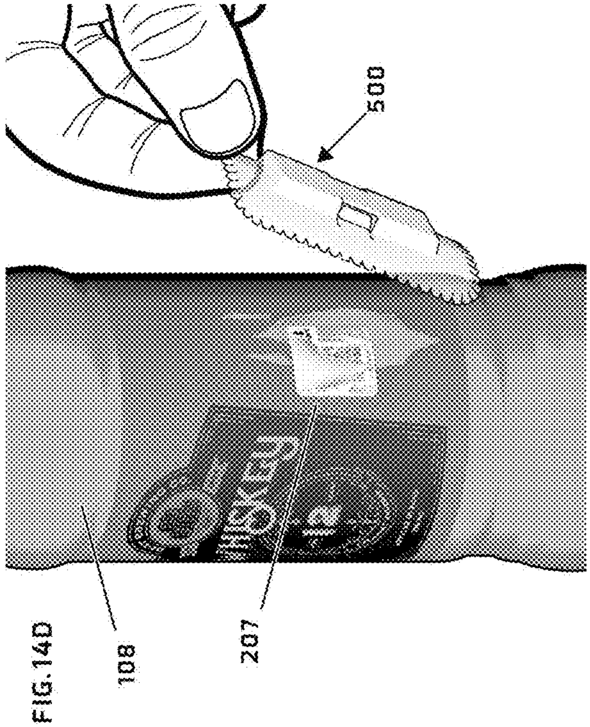
Figure 14A:
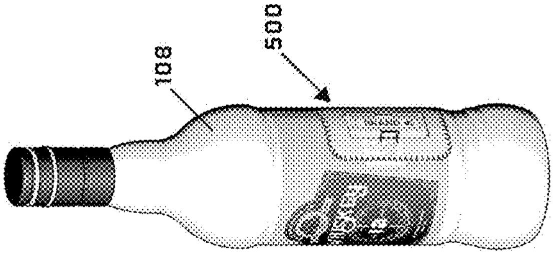
Figure 14C:
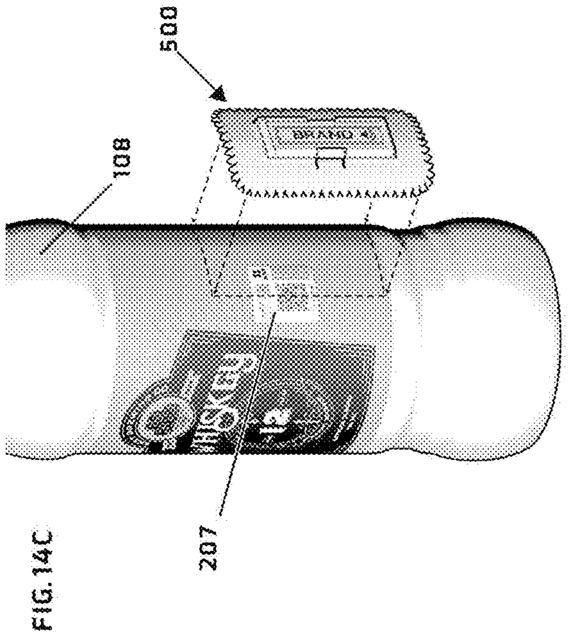

FIGS. 14A-14D represent an alternative means of attachment for another embodiment of the improved Keeper 500 designed to match concave surfaces of products such as wines and spirits. FIG. 14A shows the Keeper 500 attached to a spirit bottle 108. FIG. 14B shows the Keeper 500 with a slightly concave shape and its EAS label 162 in place and not accessible by a customer or shoplifter. Keeper 500 is made of a thin rigid or semi-rigid plastic. FIG. 14C shows the Keeper 500 with the peel-off paper 142 totally removed and in the process of being glued onto the product 108 whereas the improved Keeper 500 covers a printed area such as a fiscal stamp 207 of the product's label. FIG. 14D shows how the improved Keeper 500 permanently damages the printed area of the product 108 such as a fiscal stamp which will reduce the resale value of product 108 in the grey or black markets.

Figure 15A:
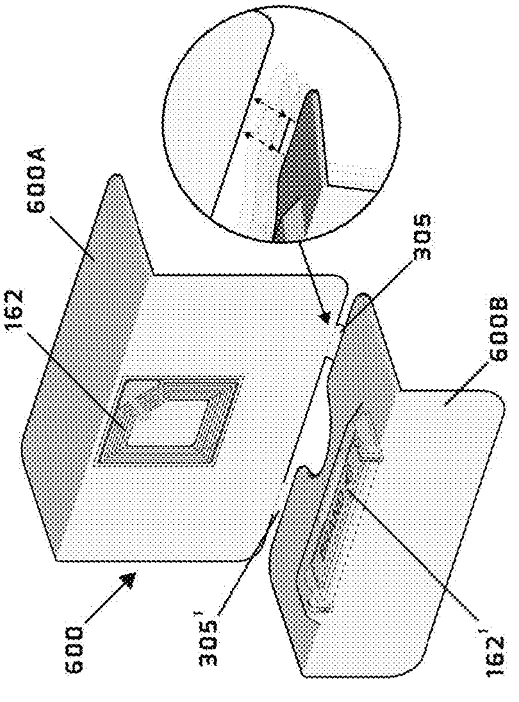
FIGS. 15A-15F represent an alternative set of improved Keepers with alternative means of attachment wherein the flexible adhesive support is replaced by two double-sided glue labels to protect products of various sizes on one side only but in two different sections of the product.
Figure 15B:
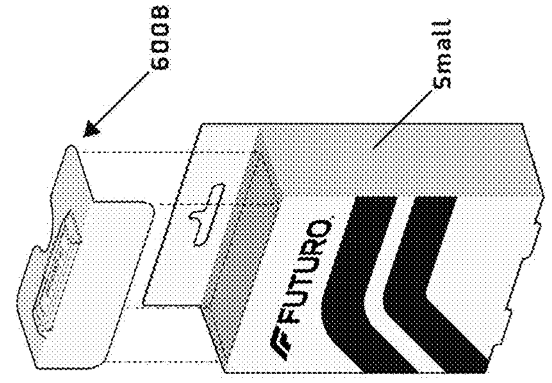
Figure 15C:
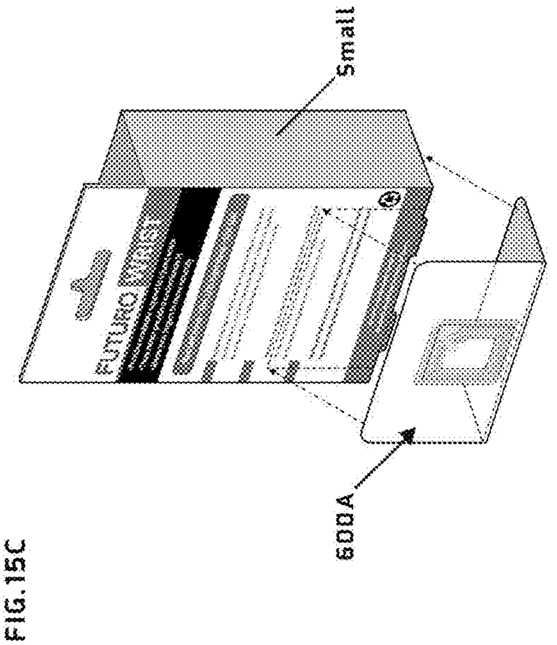
Figure 15D:
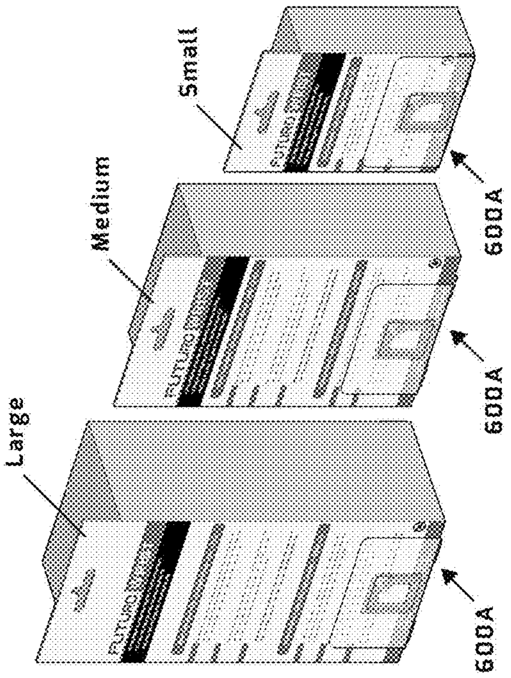
Figure 15F:
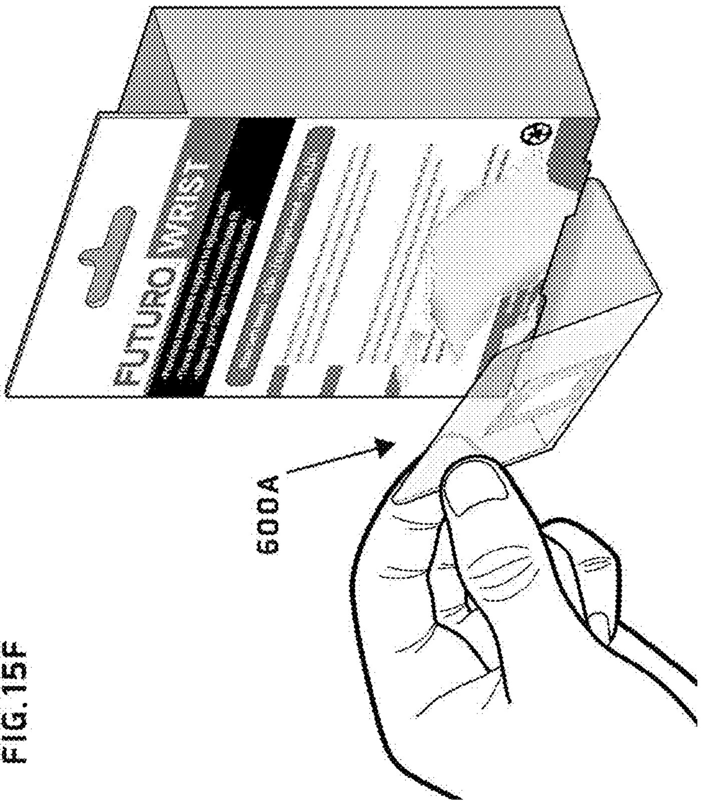
Figure 15E:
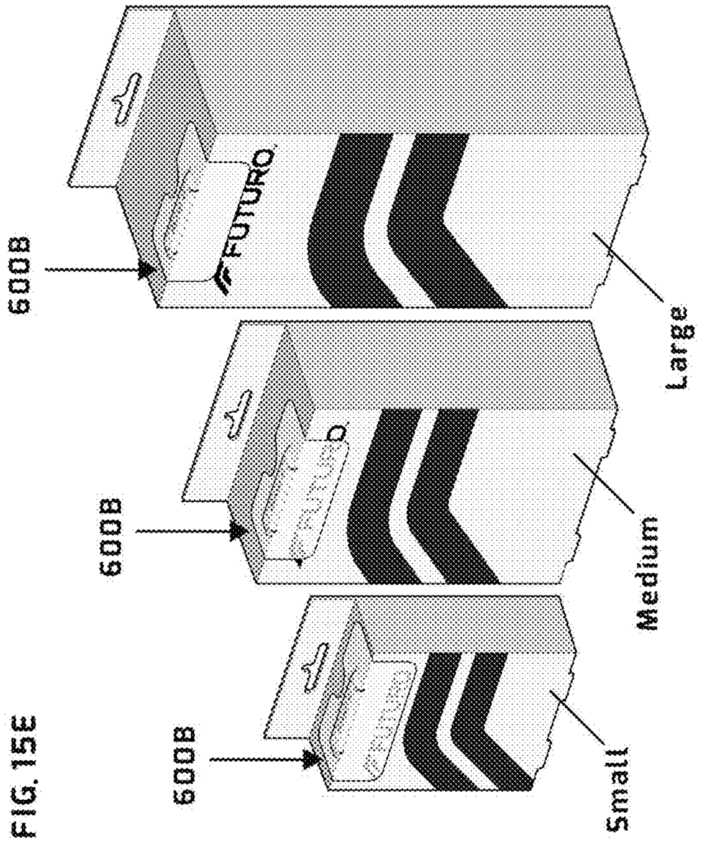

FIGS. 15A-15F represent an alternative means of attachment for another embodiment of the improved Keeper 600 designed to prevent a product packaging from being opened from at least two of its sides in addition to preventing theft. FIG. 15A shows the Keeper 600 made of two distinct sub-Keepers 600A and 600B attached to each other by easily separable means of attachment such as thin plastic junctures 305 and 305'. Keeper 600 is made of a thin rigid or semi-rigid plastic. An RF or RFID EAS label 162 and an AM EAS label 162' are glued respectively to sub-Keeper 600A and 600B. FIG. 15B shows sub-Keeper 600B being attached by means of a double-sided glue without its peel-off backing paper to one side of a product packaging and sized to prevent the package from being opened to extract the product inside. FIG. 15C shows sub-Keeper 600A being attached by means of a double-sided glue without its peel-off backing paper to another side of the same packaging and sized to prevent it from being opened to extract the product inside. FIGS. 15D-15E show the same improved Keeper 600 and its same sub-Keepers 600A and 600B attached to a same category of product packagings of different sizes such as small, medium, and large to prevent a shoplifter from opening a package to remove a high value item from inside the packaging or shoplift it. Improved Keeper 600 will save money to retailers as one size device can protect multiple sizes of a same product category.

Figure 16A:
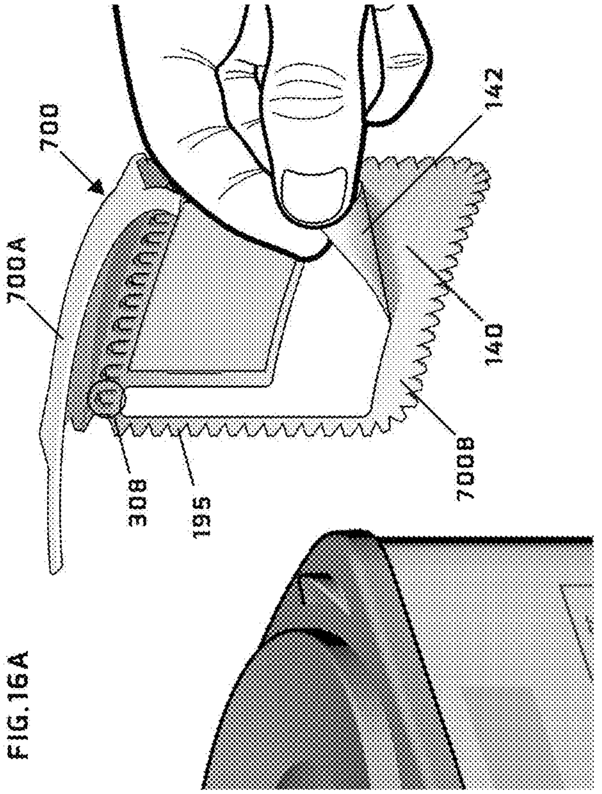
FIGS. 16A-16H represent an alternative improved Keeper with alternative means of attachment wherein the flexible adhesive support is replaced by one or two double-sided glue labels to protect products with lids on one side only allowing the product's lid to be opened after separation of the improved Keeper into two parts showing an alternative method of attaching two AM label side by side in the same magnetization polarity to the improved Keeper and showing waved plastic edges on the point of separation that do not harm the user of the product when opening and closing the lid of the product.
Figure 16B:
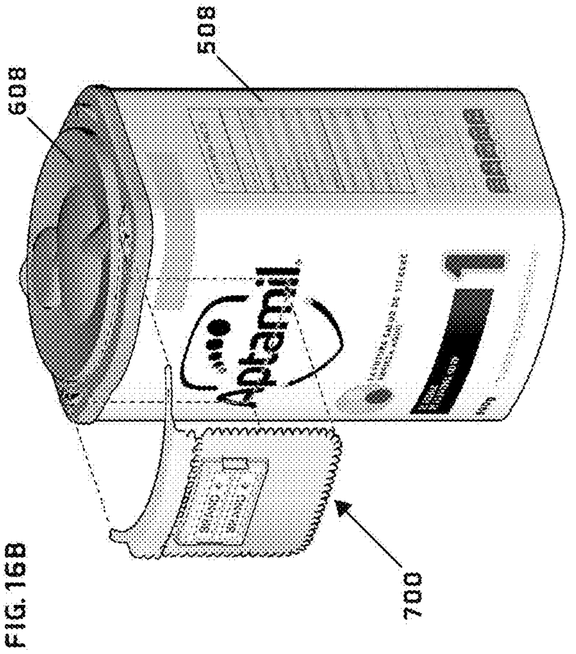
Figure 16C:
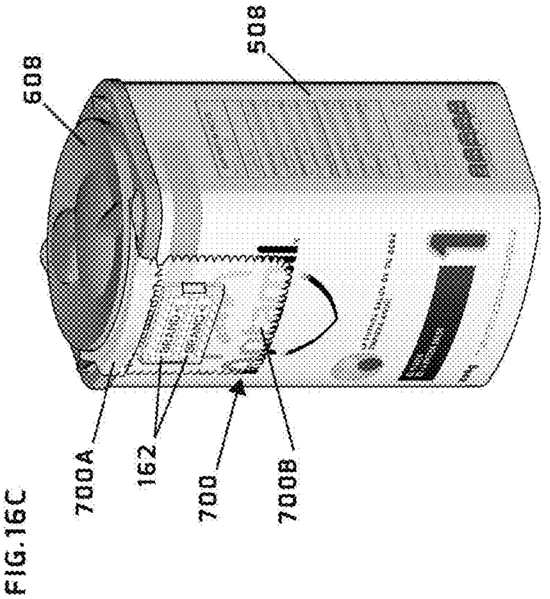
Figure 16D:
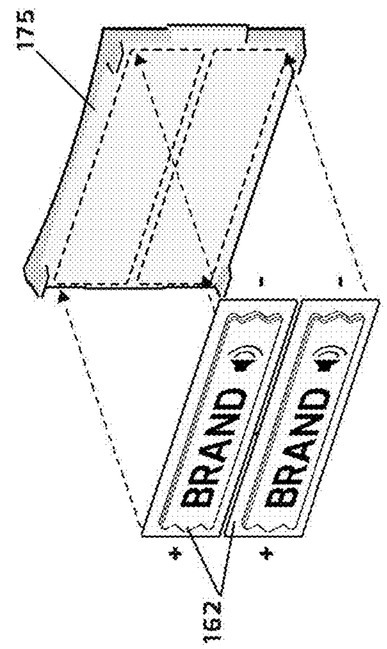
Figure 16E:
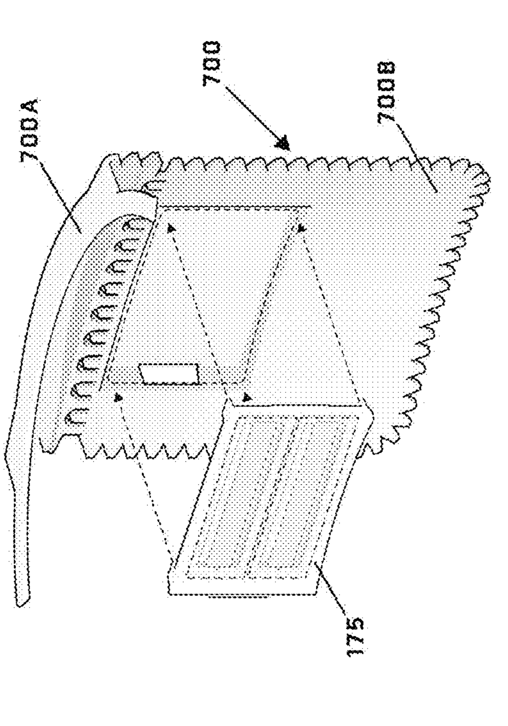
Figure 16F:
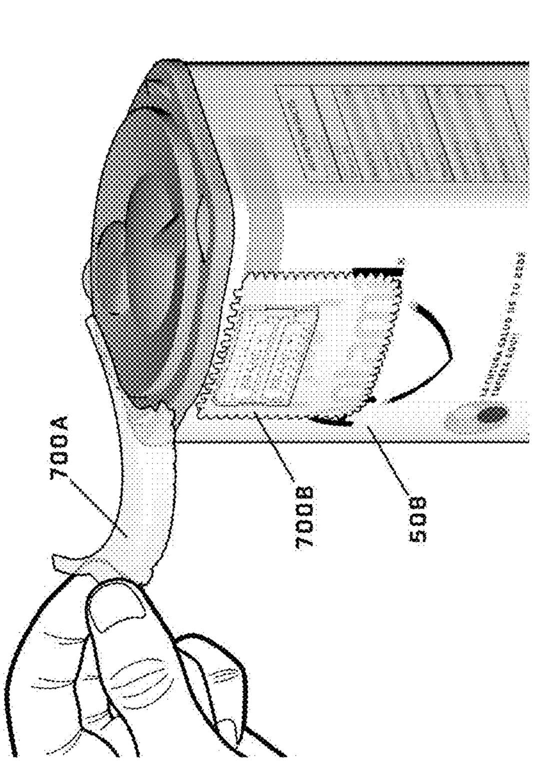
Figure 16G:
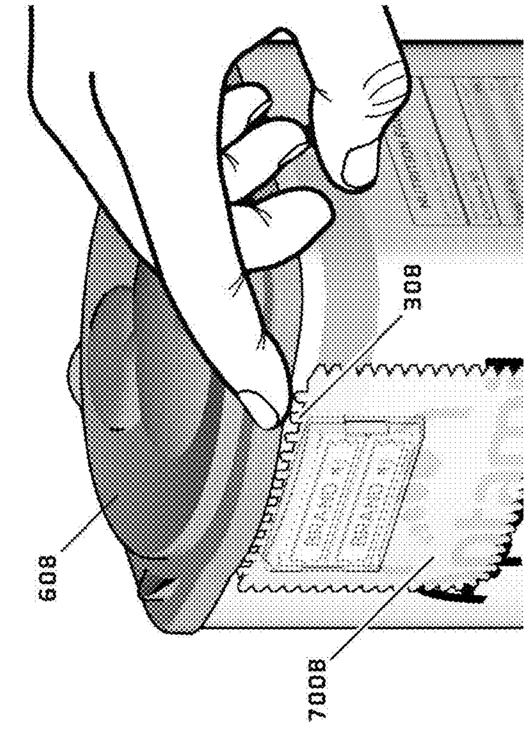
Figure 16H:
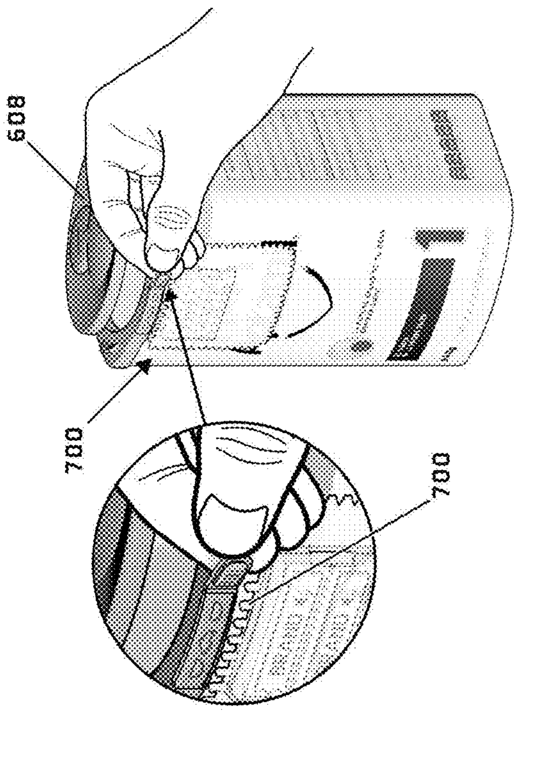

FIG. 16A represents an alternative means of attachment for another embodiment of the improved Keeper 700 wherein the flexible adhesive support 14 is replaced by a double-sided glue 140 with peel-off paper 142. The glue 140 covers most of the surface of the improved Keeper 700B section. There is no double-sided glue on section 700A which is snapped onto a product 508 lid to prevent it from being opened. The perimeter of Keeper 700 has semi-sharp teeth 195 to make it harder for shoplifter to remove/unglue the 700B section. Junction 308 made of wave sections allows the separation of section 700A from 700B without leaving any sharp edges or angles to avoid hurting a recurrent user of the product who recurrently opens and closes the lid. FIG. 16B shows Keeper 700 with the peel-off paper 142 totally removed and in the process of being glued onto the product packaging 508 where section 700B will permanently adhere to the printed matter surface of product 508 and section 700A will be clipped/snapped in place to prevent the lid 608 from being opened so a shoplifter cannot remove the contents of the product in the store. FIGS. 16C-16E shows Keeper 700 affixed to product 508 showing how section 700B with the permanent double-sided adhesive covering a large portion of the printed label of product 508, shows two AM EAS labels 162 positioned side by side in the same magnetization polarity to amplify the resonating amplitude of the AM label resonators affixed to the plastic drawer 175 snapped onto section 700B. Positioning two AM labels in opposing polarities increases the detection range between AM EAS gates in retail stores as this dual opposing configuration helps counter the loss of detection in a product such as baby formula whereas the packaging has a thin inner layer of aluminum paper that absorbs a large part of the electromagnetic signal emitted by AM EAS gates. FIGS. 16F-16H show the removal of 700A to open container 508. In FIG. 16F, a paying customer separates section 700A that had no double-sided adhesive from section 700B to free the top lid for opening and closing. More specifically, FIGS. 16G and 16H show how the wave sections 308 that remain after the separation of sections 700A and 700B are harmless for a person needing to open and close the lid 608 numerous times.

Figure 17A:
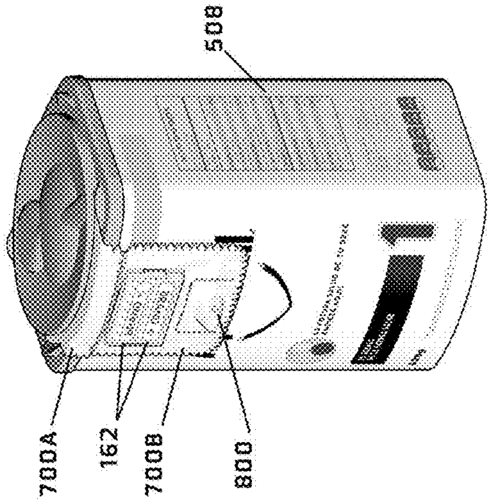
FIGS. 17A-17C show the embodiments of FIGS. 16A-16H adding a separable section to allow the insertion of an EAS self-alarming device to enhance the security level of the overall embodiment.
Figure 17B:
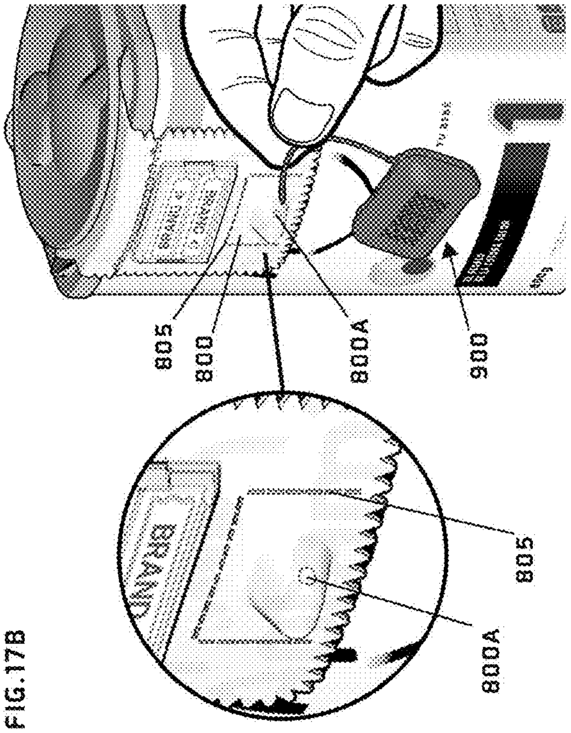
Figure 17C:
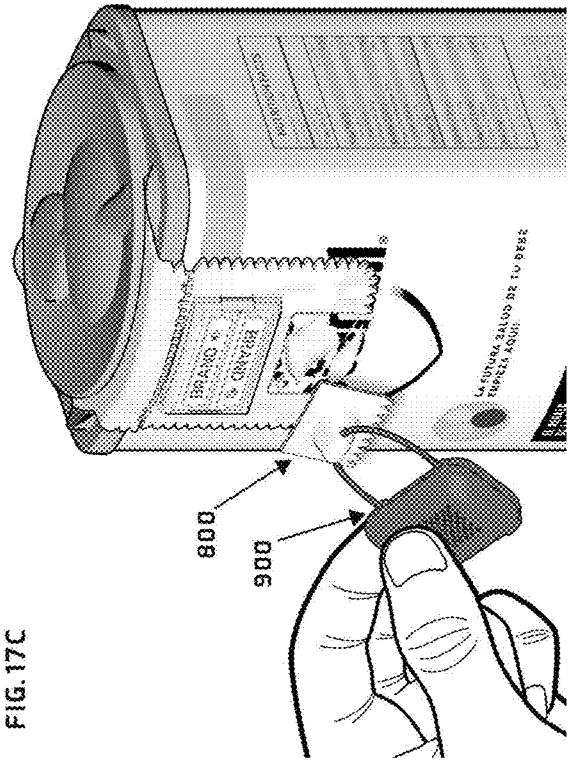

FIGS. 17A-C show the embodiments of FIGS. 16A-16H adding a separable section 800 that includes a peg hole 800A to allow the insertion of an EAS self-alarming device 900 such as a cable lock manufactured by Checkpoint Systems to add an additional layer of electronic alarming security. FIG. 17B show how the EAS self-alarming device is affix through the peg hole 800A of section 800 and depicts various dents 805 in the perimeter of section 800 to fragilize this section. FIG. 17C show how the EAS self-alarming device 900 along with separable section 800 detaches from the main section 700A and 700B destroying the printed matter under it thanks do the double-sided adhesive 140. When section 800 separates because of dents 805 breaking, both or at least a single EAS label(s) 162 would remain affixed to product 508 to make sure it triggers the EAS gates at the entrance-exits of retail stores in case a shoplifter tries to extract product 508.

Figure 18B:
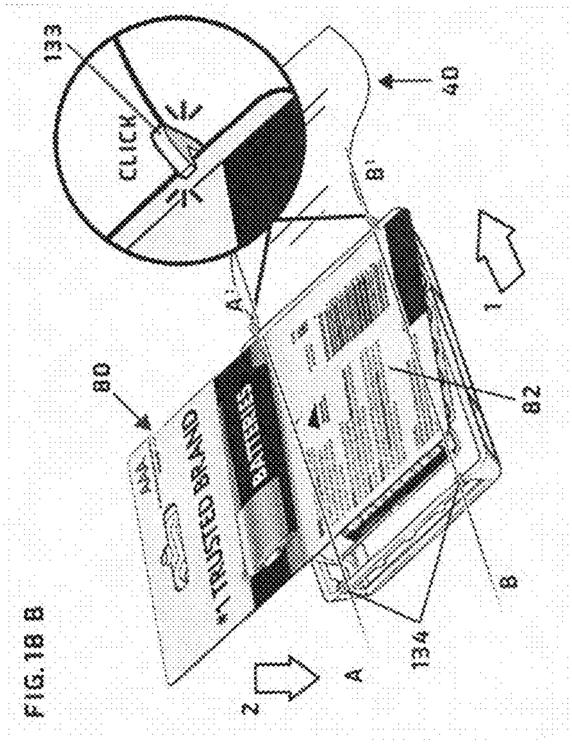
FIGS. 18A-18C show the embodiments of FIGS. 5A-5D adding clips and guide pins in order to hold the improved Keeper onto a product by clipping to it to facilitate the wrapping of the product using transparent adhesive means of attachment on a specific alignment path determined by the clips and guide pins.
Figure 18A:
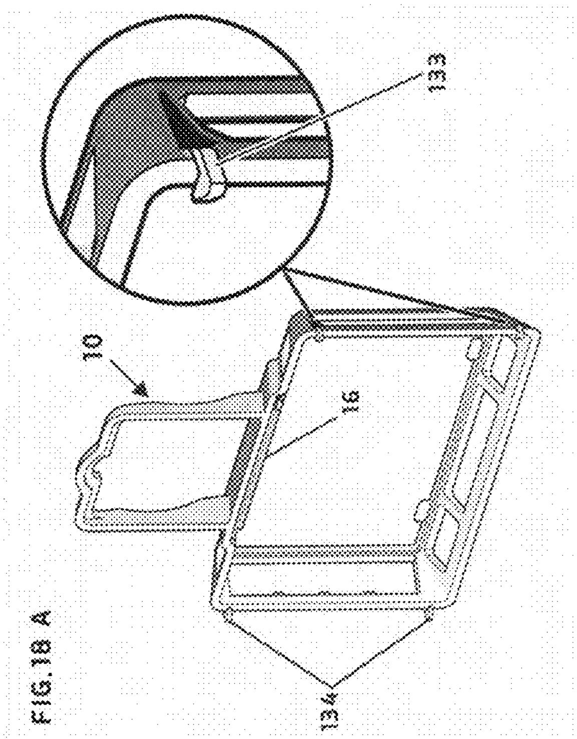
Figure 18C:
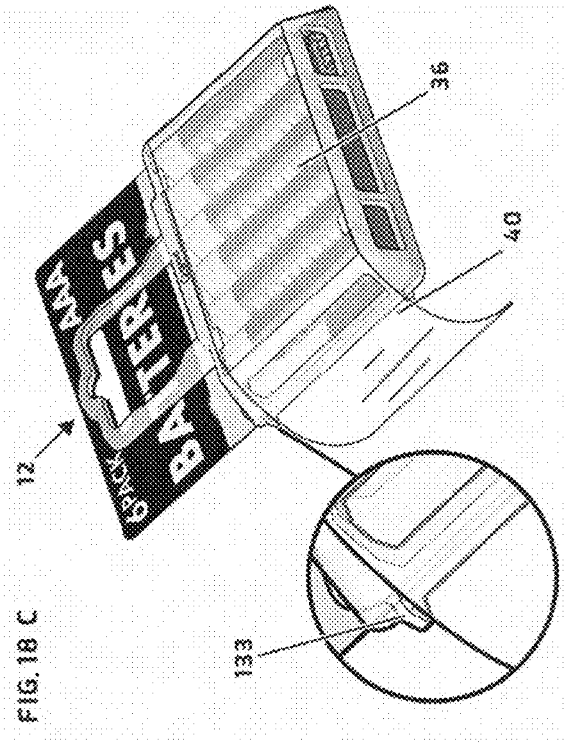

FIGS. 18A-C show a pack of batteries 80 secured with an improved Keeper 10 having an AM Acousto-Magnetic label 16 wherein the transparent flexible adhesive tape 40 is wrapped around the pack of batteries 80 in between the guide pins 133 and 134 forming alignments A-A' and B-B' to avoid mis-positioning the transparent flexible adhesive tape 40. The guide pins 133 and 134 also serves to properly position and hold in place the pack of batteries 80 before starting to wrap the transparent flexible adhesive tape 40 by clipping onto the pack of batteries. After the product 80 has been wrapped, the batteries are no longer accessible without forcing the package open. The strong permanent adhesive on transparent tape 40 will destroy the printed material 82 on the pack of batteries 80 if forcefully removed. Referring to FIG. 18A, there is shown the Keeper 10 with its guide pins 133 and 134 as well as an AM EAS label 16. Referring to FIG. 18B, the pack of batteries 80 is first clipped by the clips end of guide pins 133 and then clipped onto the batteries by guide pins 134 that will hold the Keeper 10 onto the battery pack 80 temporarily in place. Once the battery pack 80 is in position, guide pins 133 and 134 will guide the flexible adhesive tape 40 to properly be wrapped following alignments A-A' and B-B'. Referring to FIG. 18C, the clear tape 40 is now completely wrapped around the battery pack after going once again between guide pins 133 for a perfect alignment of the clear tape 40 on the battery pack 80 covering the area 36 of casing 12 and the Keeper is fully attached to the battery pack 80 and the Keeper and the battery pack 80 constitute one unitary product. Thereafter, a customer may purchase the battery pack 80 at a cashier with the barcode, as shown in FIG. 18B, visible for a cashier to scan the product. Similarly, at the checkout, the AM security element 16 may be deactivated by the cashier and the customer takes the product home. The customer thereafter may remove or cut the clear tape 40.

Figure 19A:
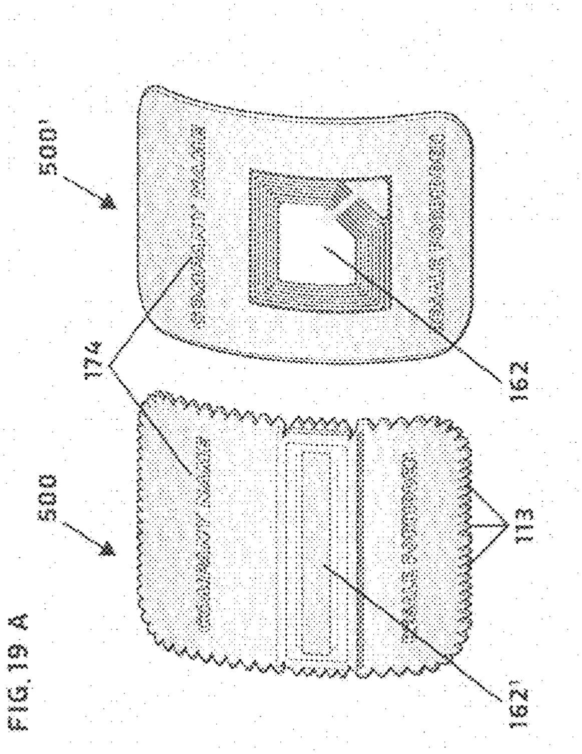
FIGS. 19A-19F show the embodiments of FIGS. 14A-D wherein a flexible improved Keeper is able to be affixed by the intermediary of a strong double-sided adhesive onto rounded or perfectly flat surfaces resulting in an improved Keeper that can cover a very large variety of wine and spirits bottles of different geometries and sizes.
Figure 19B:
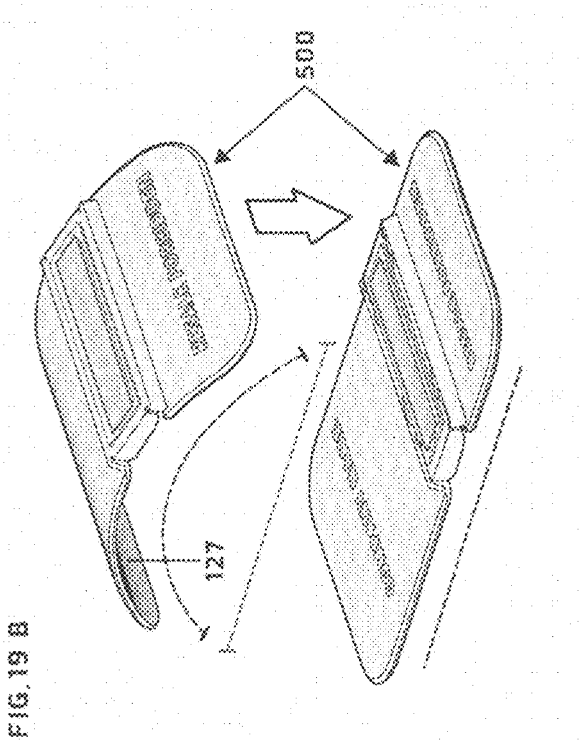
Figure 19C:
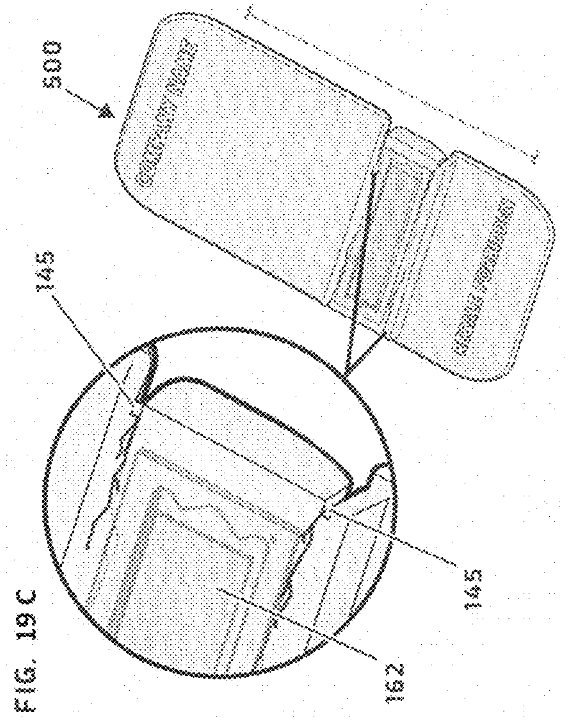
Figure 19D:
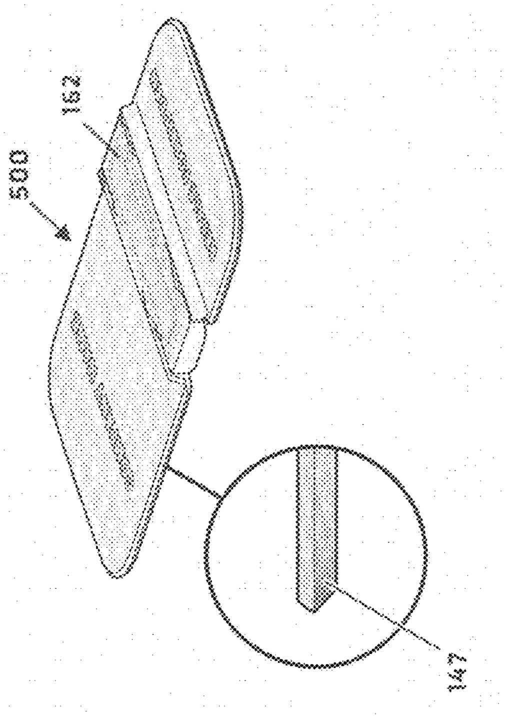
Figure 19F:
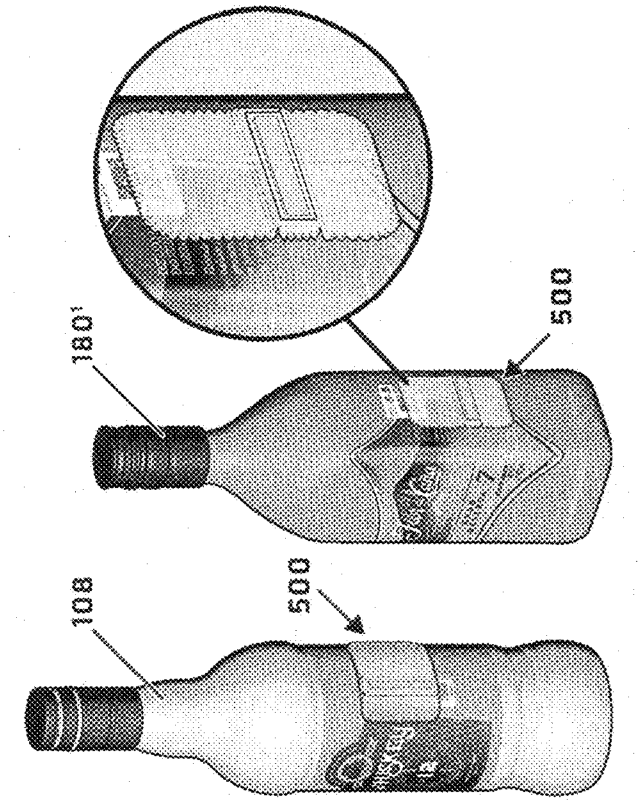
Figure 19E:
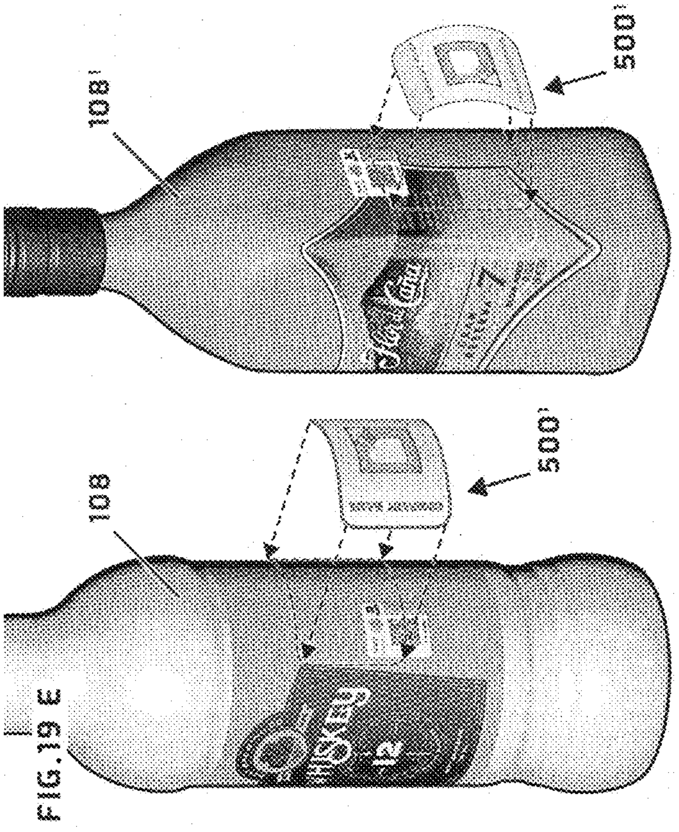

FIGS. 19A-F represent an alternative means of attachment for another two embodiments of the improved Keeper 500 and 500' designed to match concave and flat surfaces of products such as wine and spirits bottles. FIG. 19A show the Keepers 500 and 500' whereas 500' has an EAS-RF label and/or a RFID flat label 162 affixed to it between the Keeper and a double side adhesive pad 127 and 500 has an EAS-AM label affixed to it between the Keeper and a double side adhesive pad 127 as seen in FIG. 19B. Keeper 500 has semi-sharp teeth 113 on all its perimeter to make the unlawful removal of the improved Kepper 500 by a shoplifter extremely difficult without using a hand tool and permanently damaging the product making it difficult to resell on the black market. FIG. 19B shows the improved Keeper 500 in its natural concave position and in its totally flat position in order to match various types of bottle geometries. FIG. 19C shows debilitating sections 145 at the extremities on both sides of the cavity that houses the EAS-AM label 162' in order to allow the improved Keeper 500 to lay perfectly flat reducing the spring effect allowing a strong double side adhesive 127 to hold the improved Keeper 500 perfectly in place either in a concave or flat surface. FIG. 19D represents the edge of the perimeter of the improved Keeper 500 in a knife sharp shape to make it harder to remove by a shoplifter. FIG. 19E shows the same improved Keepers 500' being placed on a curved product 108 and flat product 108' thanks to the strong and clear double sided adhesive 127. FIG. 19F shows the same improved Keeper 500 being placed on a curved product 108 and flat product 108' thanks to the strong and clear double sided adhesive 127.

Figure 20B:
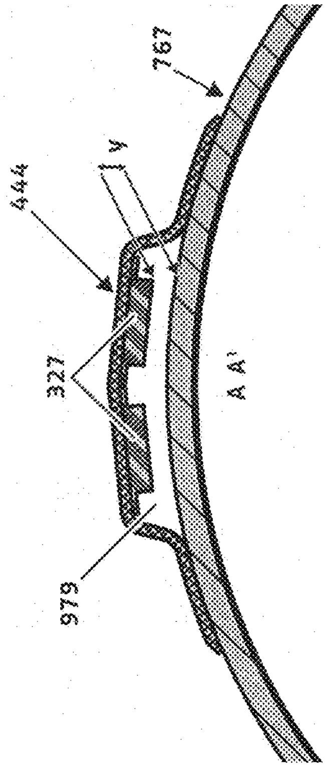
FIGS. 20A-20C show an improved Keeper designed to protect metal/aluminum/iron products sold in cans or metal containers such as those used to sell powder infant formula, deodorant, food, beer and soda among others. This improved Keeper has a special housing not accessible to the shoplifter that fits the EAS label(s) (AM and/or RF and/or RFID) that has been modified in order to create a small gap between the EAS label(s) affixed to the improved Keeper and the metal/aluminum/iron cans of the products in order to enhance the detection performance of such EAS label as metal/aluminum/iron absorbs most of the electromagnetic energy emitted by EAS antennas installed after the point of sale at retail stores. In this configuration the improved Keeper affixed to metal/aluminum/iron cans will be able to properly trigger the EAS antennas and effectively combat shoplifting.
Figure 20A:
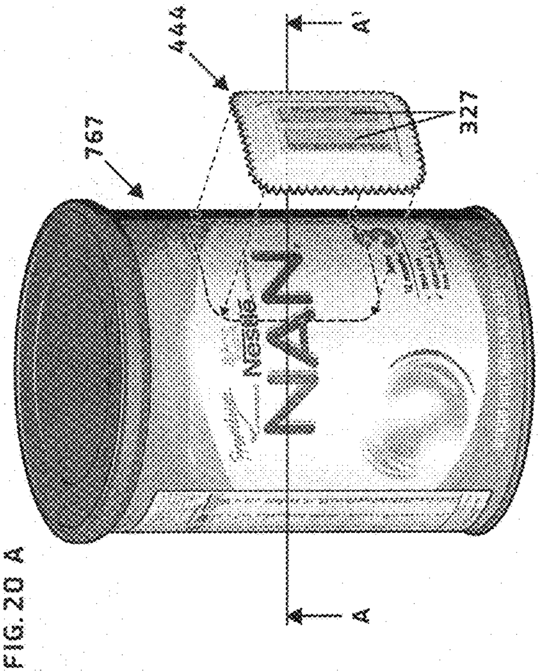
Figure 20C:
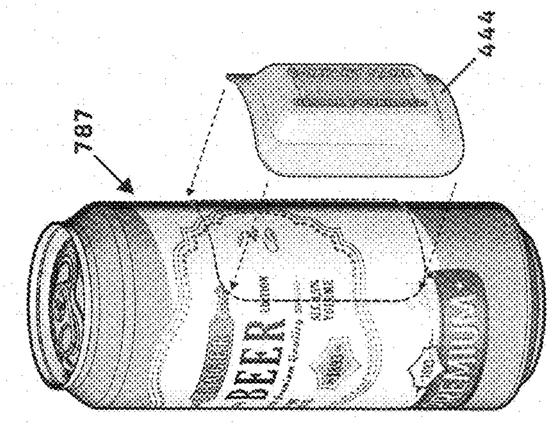

FIGS. 20A-C represent an alternative improved Keeper designed to protect product containers or packaging with a high content of metal/aluminum/iron. The Keeper design will compensate for the loss of the electromagnetic interrogation signal emitted by EAS gates installed after the point of sale which will make AM, RF or RFID labels affixed to metal products or metal containers to resonate and trigger the EAS gates. FIGS. 20A-C represent the improved Keeper 444 affixed to a metallic infant formula can 767 and a metal beer can 787. FIG. 20B shows an A-A' view of can 767 showing the housing 979 of the improved Keeper 444 where one or two AM labels 327 are separated by a distance Y from the metal can 767. Y can be anywhere between 2 and 10 mm depending on the quantity of metal contained in the product or product packaging. A metal beer can will need a smaller Y distance compared to a big can made of iron for a product such as canned food. The Y distance will be needed no matter the technology of the EAS label (AM, RF or RFID). The EAS labels 327 inside the housing 979 are not accessible from the outside to a shoplifter, if the housing 979 is tampered it will permanently damage the product label thanks to the very strong double-sided adhesive used to affix the improved Keeper.

Figure 21A:
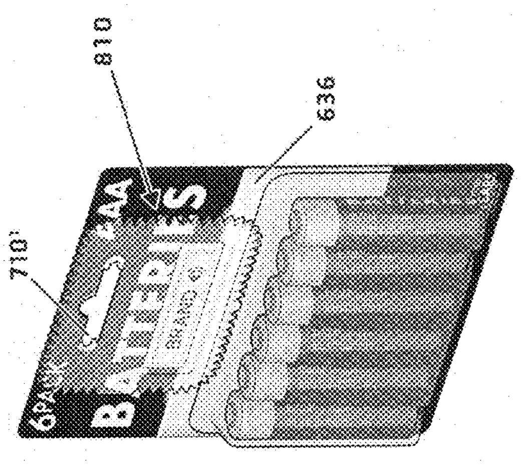
FIGS. 21A-21D show an improved Keeper that includes alignment pins that allow a perfect alignment of the improved Keeper to specific areas of high theft items such as but not limited to battery packs. The alignment pins are also useful when manufacturing the improved Keeper in order to ease the proper positioning of the double-sided adhesive pads onto the improved Keepers at the point of manufacture that will allow store personnel to affix the improved keeper onto a product.
Figure 21B:
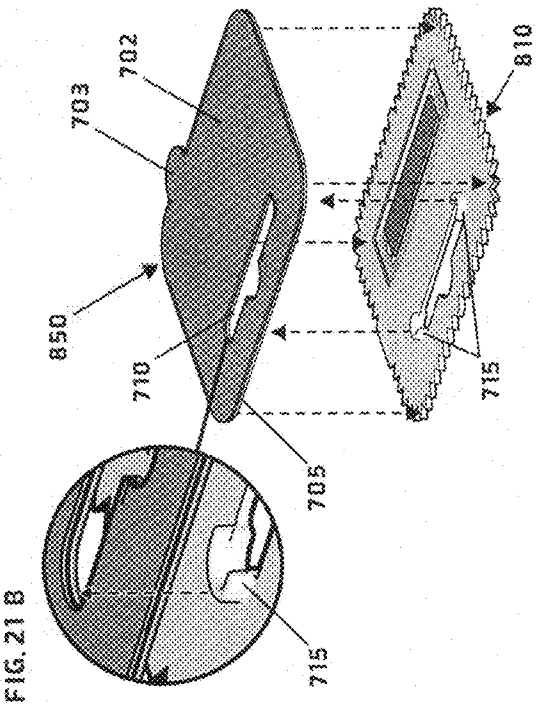
Figure 21C:
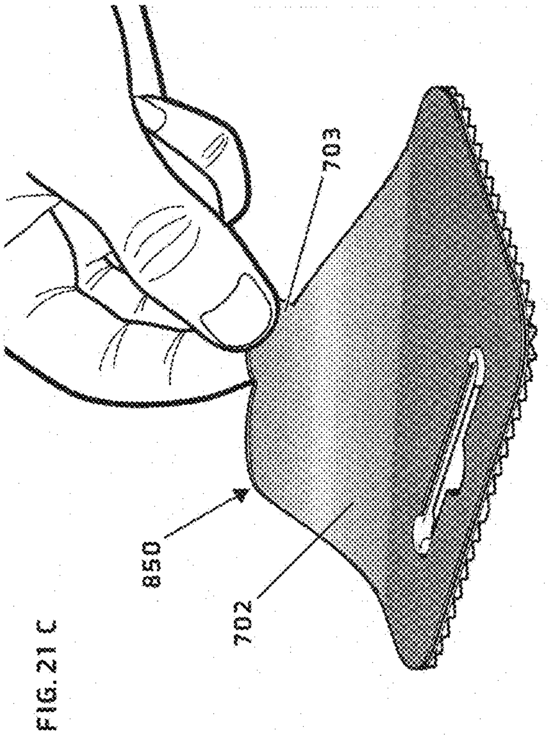
Figure 21D:
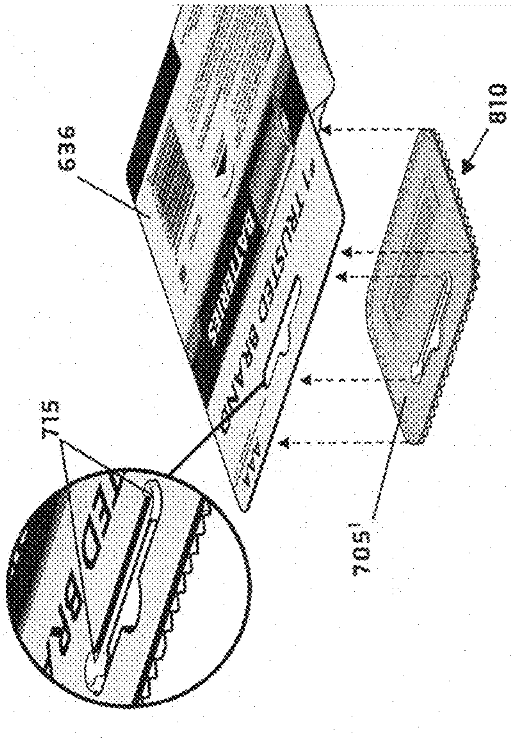

FIGS. 21A-D show an improved Keeper 810 that includes alignment pins that may be on the peg-hook area among other areas to allow a perfect alignment between, as an example, the improved Keeper peg-hook area and an area on specific high theft items such as but not limited to battery packs that have peg-hook openings. As the improved Keeper uses a very strong double-sided adhesive glue with a very strong initial tack to bond onto a product it is very important to properly align it on products to avoid the need to remove the improved Keeper after a faulty positioning to replace it as such action can damage the product's label and/or packaging. The alignment pins are also useful when manufacturing the enhanced Keeper to facilitate the proper alignment/positioning of the double-sided adhesive pad onto the improved Keeper. FIG. 21A shows an improved Keeper 810 perfectly in place whereas the peg-hook area of the improved Keeper 710' perfectly matches the peg-hook area of the battery back 636 that was not damaged by several positioning attempts. FIG. 21B shows the double-sided strong glue adhesive pad 850 with its peel-off paper 702, its peel off tab 703 and its peg-hook die-cut area 710. It also shows the improved Keeper 810 with its alignment pins 715. It also depicts the strong double sided adhesive pad 850 with one side being perfectly aligned thanks to the alignment pins 715 to the improved Keeper 810. FIG. 21C shows how the peel-off paper 702 of the strong double-sided adhesive pad 850 is being removed by pulling on the peel-off tab 703 to expose the second side of the strong double-sided adhesive pad 705'. FIG. 21D shows how the improved Keeper 810 is aligned to perfectly match the common peg-hook areas of battery pack 636 thanks to the alignment pins 715. This is only one example of how alignment pins such as 715 can help align an improved Keeper using very strong double-sided adhesive onto a specific area of a product or product packaging.

Figure 22B:
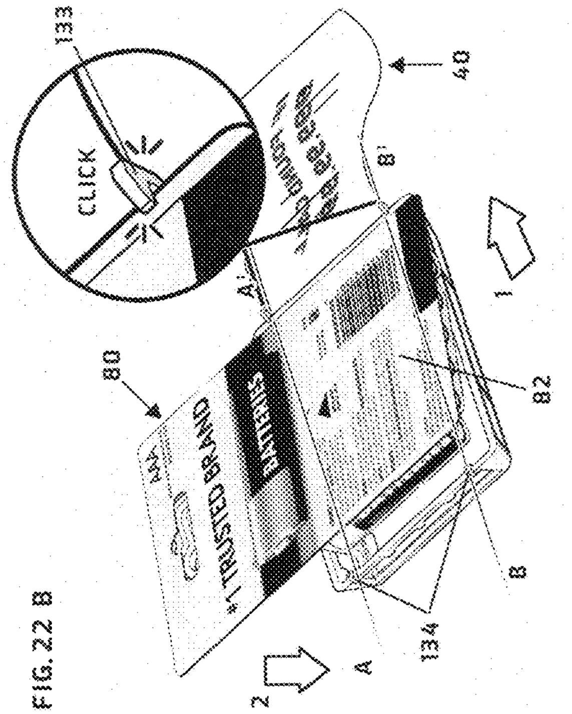
FIGS. 22A-22C show the embodiments of FIGS. 18A-C where the EAS label has been replaced by a non-EAS plain label 16' that carries a deterrent message and a second deterrent and/or preventive message has been pre-printed on the flexible adhesive support wrapped around the product.
Figure 22A:
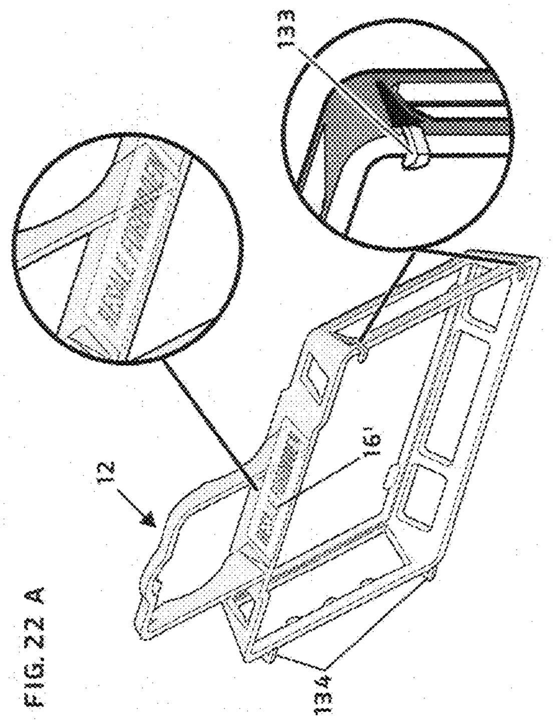
Figure 22C:
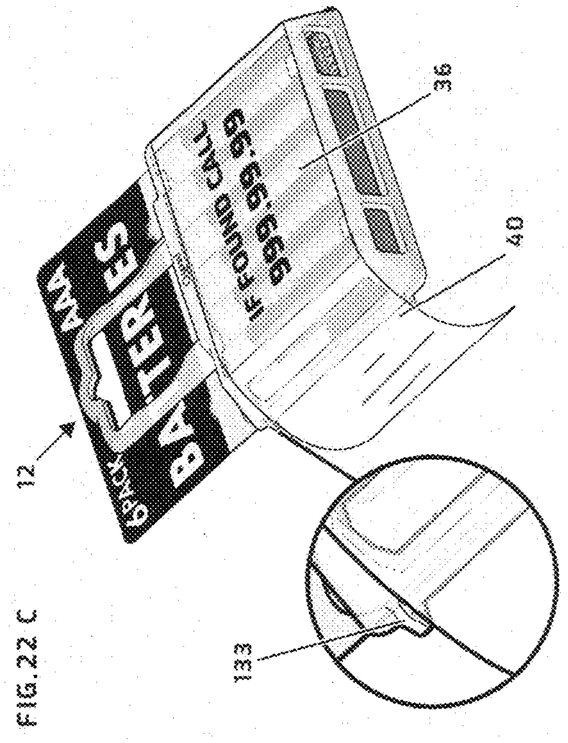

FIGS. 22A-C show the embodiments of FIGS. 18A-C where on FIG. 22A the EAS label 16 has been replaced by a non-EAS plain label 16' that carries a deterrent message not accessible from the outside to a shoplifter to deter a shoplifter inside a retail store. FIG. 22C shows and a second deterrent and/or preventive message not accessible from the outside to a shoplifter that has been pre-printed on the inward side of the flexible adhesive support 40 wrapped around the product meant to help law enforcement officers detect a stolen product to return it to its owner. If forcibly removed the improved Keeper and its flexible adhesive support will damage the product label packaging 80 and product label 82 considerably reducing the value of the stolen good. This improved Keeper variation operates as a benefit denial antitheft device which is independent from an EAS detection system.

Figure 23A:
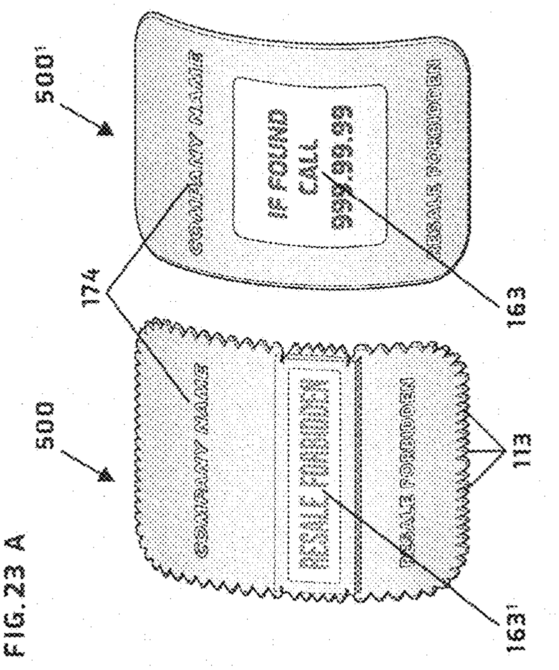
FIGS. 23A-23F show the embodiments of FIGS. 19A-D whereas the EAS labels have been replaced by non-EAS plain labels that carries a deterrent message and/or preventive message.
Figure 23B:
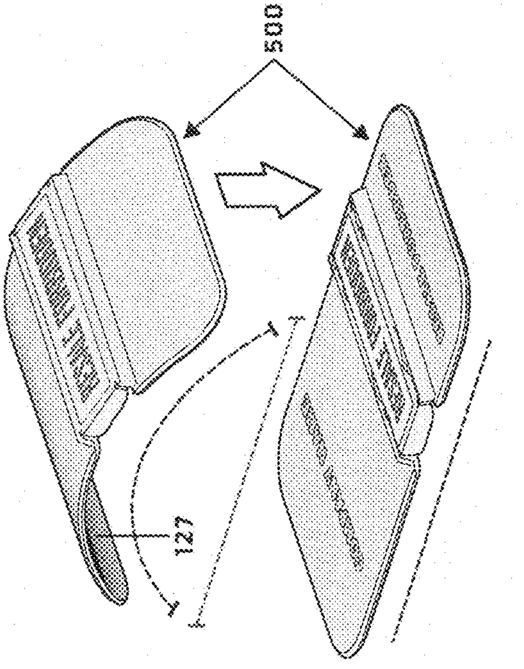
Figure 23C:
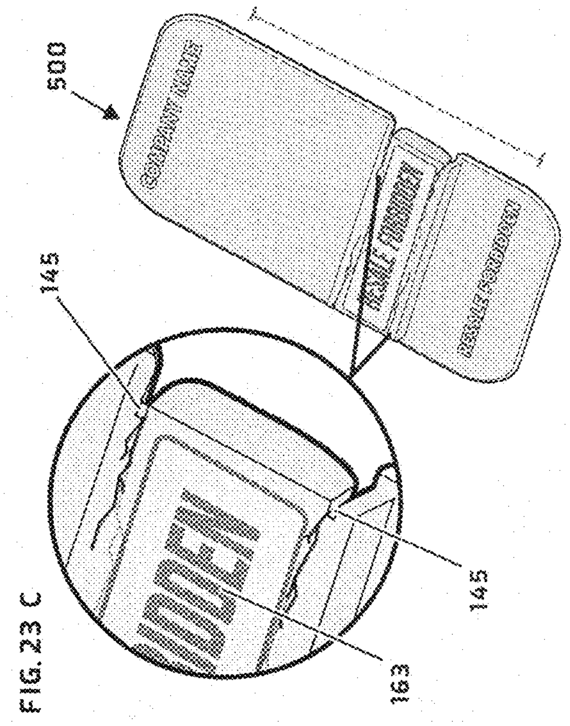
Figure 23D:
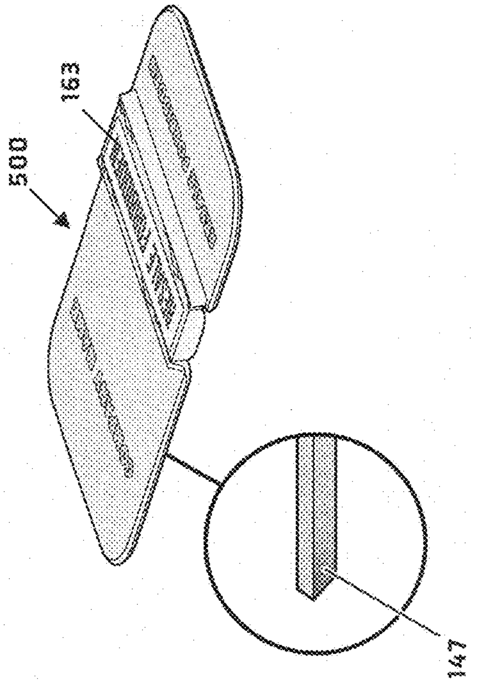
Figure 23F:
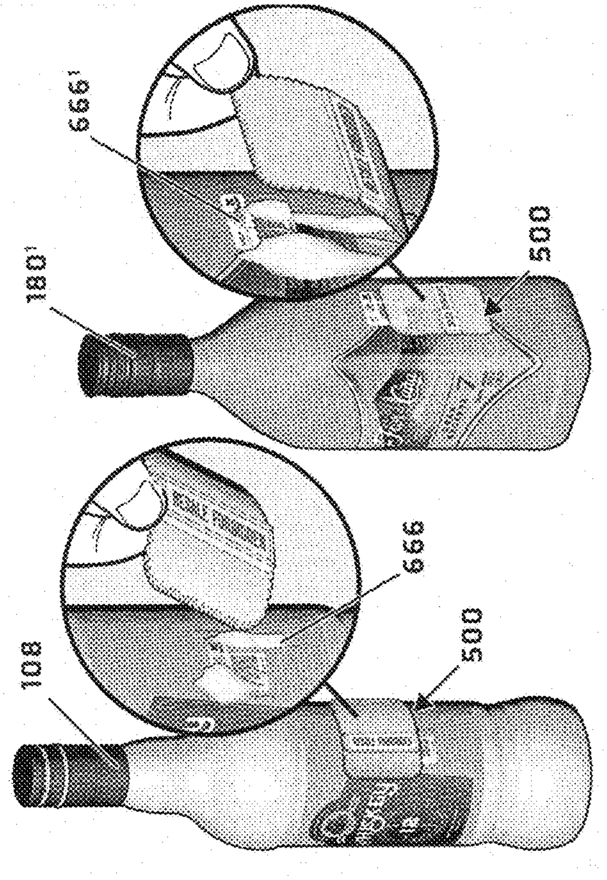
Figure 23E:
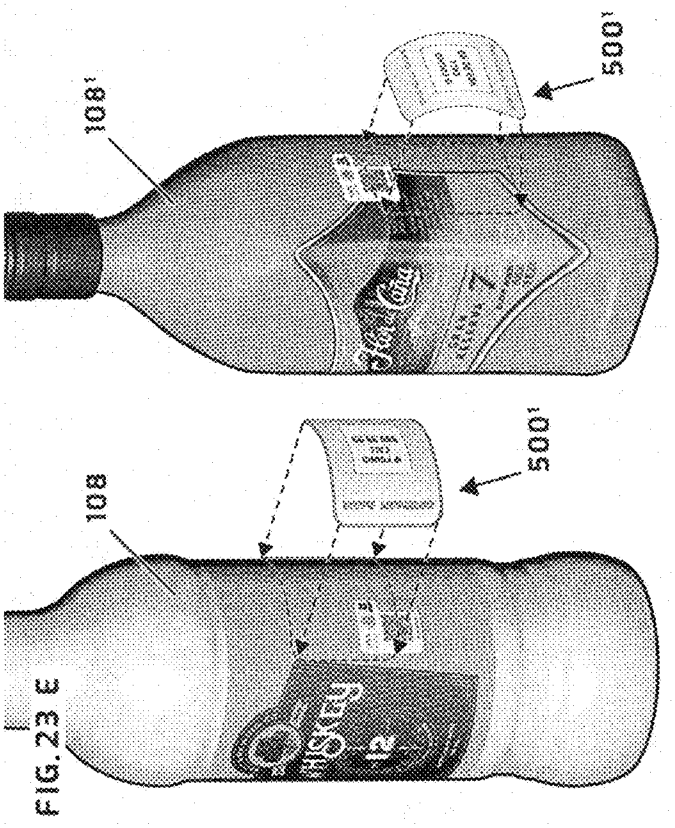

FIG. 23A-F show the embodiments of FIGS. 19A-F wherein the EAS labels 162 and 162' have been replaced by non-EAS plain labels 163 and 163'. FIG. 23A shows improved Keepers 500 and 500' wherein EAS labels 162 and 162' have been replaced by non-EAS plain labels 163 and 163' pre-printed with a deterrent and/or preventive message. FIGS. 23E and 23F show how if forcibly removed the improved Keepers 500 and 500' will damage the products 108 and 108' labels considerably reducing the value of the stolen good thus fighting organized retail crime. This improved Keeper variation operates as a benefit denial antitheft device which is independent from an EAS detection system.

Figure 24A:
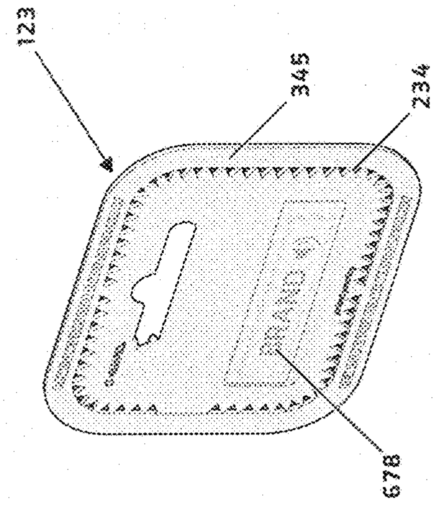
FIGS. 24A-24D show the improved Keeper with an additional security detachable frame with no sharp edges that surrounds the semi-sharp teeth to provide a physical security barrier between the semi-sharp teeth and a paying customer who might inadvertently get in contact with the improve Keeper. If a shoplifter tries to remove the improved Keeper from a product the security frame will easily detach first exposing the semi-sharp teeth that may injure a shoplifter when excess force is applied in trying to remove the Keeper from the product.
Figure 24B:
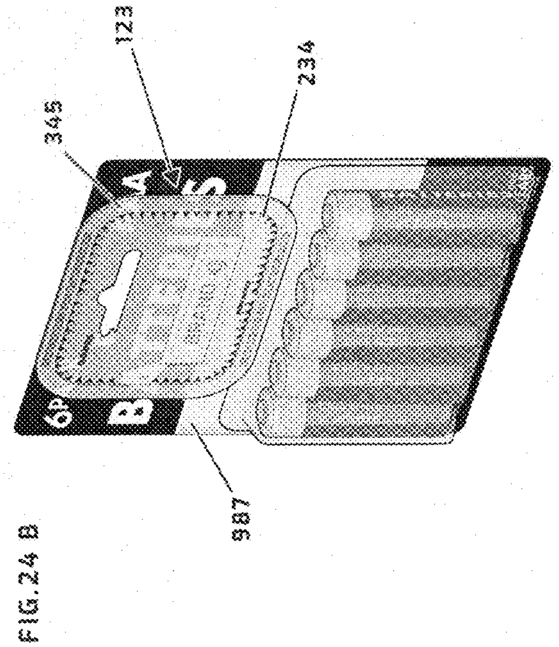
Figure 24C:
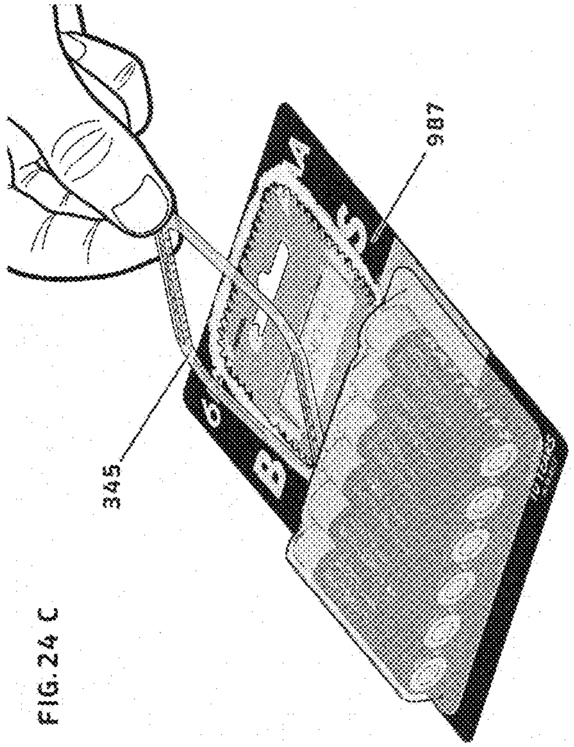
Figure 24D:
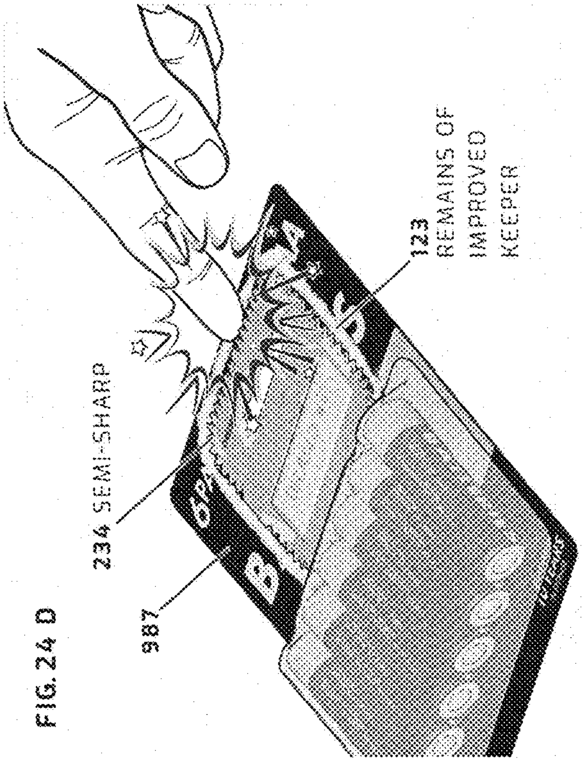

FIGS. 24A-D show an improved Keeper with an additional security detachable frame to avoid paying customers or store operators from potentially getting injured by the semi-sharp teeth. FIG. 24A shows the Keeper 123 with its semi-sharp teeth 234 surrounded by a security frame 345 that circles the entire perimeter of semi-sharp teeth and the security or pre-printed label element 678. FIG. 24B show the improved Keeper 123 bonded onto battery pack 987 using strong double-sided adhesive where the semi-sharp teeth 234 are protected by security frame 345 that prevents a paying customer or store user from being injured by the semi-sharp teeth 234. FIG. 24C shows a shoplifter's or store operator's hand trying to remove the keeper 123 from packaging 987 wherein the security frame 345 is the first to detach from the keeper 123 causing initial damage to the printed label of packaging 987. FIG. 24D shows a shoplifter's hand having removed the security frame 345 exposing the semi-sharp teeth 234 that may injure the shoplifter's hand after applying force to remove what is left of the Keeper 123 further damaging the battery pack packaging 987.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claim.

It is claimed:

1. A disposable security device keeper with no locking mechanism ("Keeper") comprising a rigid or semi-rigid casing that substantially corresponds to the shape of a product and adapted to cover at least a portion of one side of the product but not fully enclosing the product; a security element or a non-EAS label attached to the casing and adapted to be inaccessible to a consumer when the Keeper is attached to the product; and a flexible adhesive support attached to the casing and adapted to wrap around the product or a two-sided adhesive extending around the perimeter of the casing, one side of the two-sided adhesive attached to the casing and the second side of the two-sided adhesive adapted to attach to the product to secure the Keeper to the product.

2. The Keeper of claim 1 wherein the flexible adhesive support comprises a transparent tape with a permanent glue and a peel-off backing material.

3. The Keeper of claim 1 wherein the casing further includes a plurality of arrow-shaped barbs for attaching the flexible adhesive support to the casing and the flexible adhesive support includes a plurality of perforations for engaging the plurality of arrow-shaped barbs.

4. The Keeper of claim 3 wherein the flexible adhesive support comprises a transparent tape with a permanent glue and a peel-off backing material.

5. The Keeper of claim 1 wherein the casing includes a top wall, a bottom wall, a first side wall and a second side wall forming an open frame, the casing adapted to fit around the perimeter of the product.

6. The Keeper of claim 5 wherein the first side wall includes at least one clip for attaching the casing to the product and adapted to facilitate the wrapping of the flexible adhesive support and the second side wall includes at least one clip for attaching the casing to the product and adapted to facilitate the wrapping of the flexible adhesive support.

7. The Keeper of claim 6 wherein the first side wall includes two clips and the second side wall includes two clips.

8. The Keeper of claim 1 wherein the casing further includes an upward extending support having a peg-hole.

9. The Keeper of claim 5 wherein the casing further includes an upward extending support having a peg-hole.

10. The Keeper of claim 8 wherein the upwardly extending support is adapted to fit on top or through a peg-hole on the product and to prevent tearing of the product peg-hole.

11. The Keeper of claim 9 wherein at least one of said walls of said Keeper includes one or more apertures.

12. The Keeper of claim 1 wherein the Keeper shape is selected from the group consisting of rectangular, square and oval.

13. The Keeper of claim 1 wherein the security element is selected from the group consisting of an EAS label, an antenna, an RFID element and antenna and a combination of an EAS label and an RFID element.

14. The Keeper of claim 1 wherein the flexible adhesive support includes a transparent tape having an opaque section adapted to mask an information section of a product which is not intended to be used with the Keeper.

15. The Keeper of claim 1 wherein the non-EAS label includes a deterrent message.

16. The Keeper of claim 1 wherein the flexible adhesive support includes a preprinted message.

17. A disposable security device keeper with no locking mechanism ("Keeper") comprising a rigid or semi-rigid casing that substantially corresponds to the shape of a product and adapted to cover at least a portion of one side of the product but not fully enclosing the product; a security element or a non-EAS label attached to the casing and adapted to be inaccessible to a consumer when the Keeper is attached to the product; and a means for securing the Keeper to the product.

18. The Keeper of claim 17 wherein the means for securing the Keeper to the product is selected from the group consisting of (a) a flexible adhesive support attached to the casing and adapted to wrap around the product, (b) a two-sided adhesive extending around the perimeter of the casing, one side of the two-sided adhesive attached to the casing and the second side of the two-sided adhesive adapted to attach to the product to secure the Keeper to the product, and (c) a transparent tape with a permanent glue.

19. The Keeper of claim 18 wherein the casing includes a top wall, a bottom wall, a first side wall and a second side wall forming an open frame, and an upward extending support having a peg-hole; the casing adapted to fit around the perimeter of the product.

20. The Keeper of claim 19 wherein the first side wall includes at least one clip for attaching the casing to the product and adapted to facilitate the wrapping of the flexible adhesive support and the second side wall includes at least one clip for attaching the casing to the product and adapted to facilitate the wrapping of the flexible adhesive support.

21. The Keeper of claim 20 wherein the upwardly extending support is adapted to fit on top or through a peg-hole on the product and to prevent tearing of the product peg-hole.

22. The Keeper of claim 21 wherein at least one of said walls of said Keeper includes one or more apertures.

23. The Keeper of claim 22 wherein the Keeper shape is selected from the group consisting of rectangular, square and oval.

24. The Keeper of claim 23 wherein the security element is selected from the group consisting of an EAS label, an antenna, an RFID element and antenna and a combination of an EAS label and an RFID element.

* * * * *